United States Patent
Kano et al.

(10) Patent No.: US 7,209,434 B2
(45) Date of Patent: Apr. 24, 2007

(54) PATH MODIFYING METHOD, LABEL SWITCHING NODE AND ADMINISTRATIVE NODE IN LABEL TRANSFER NETWORK

(75) Inventors: Shinya Kano, Kawasaki (JP); Masatake Miyabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 937 days.

(21) Appl. No.: 10/108,966

(22) Filed: Mar. 28, 2002

(65) Prior Publication Data

US 2003/0043745 A1 Mar. 6, 2003

(30) Foreign Application Priority Data

Aug. 27, 2001 (JP) ............................. 2001-256635

(51) Int. Cl.
  *G01R 31/08* (2006.01)
(52) U.S. Cl. .................. 370/216; 370/242; 370/389
(58) Field of Classification Search ................ 370/389, 370/396, 230, 231, 235, 236, 392, 216–220, 370/242, 397, 399; 709/237, 238–242, 235; 714/4
See application file for complete search history.

(56) References Cited

U.S. PATENT DOCUMENTS

| 6,501,754 B1 * | 12/2002 | Ohba et al. ............... 370/389 |
| 6,529,958 B1 * | 3/2003 | Oba et al. ................ 709/237 |
| 2001/0033574 A1 * | 10/2001 | Enoki et al. ............ 370/396 |
| 2006/0036892 A1 * | 2/2006 | Sunna ..................... 714/4 |

OTHER PUBLICATIONS

J. Ash et al., LSP Modification Using CR-LDP. MPLS Working Group, Internet Draft, Document: draft-ietf-mpls-crlsp-modify-03.txt Mar. 2001.

B. Jamoussi, et al. Constraint-Based LSP Setup Using LDP. MPLS Working Group, Internet Draft, Document: draft-ietf-mpls-cr-ldp-05.txt Feb. 2001.

P.A. Smith, et al. Generalized MPLS Signaling-CR-LDP Extensions. Network Working Group, Internet Draft, Document: draft-ietf-mpls-generalized-cr-ldp- 02.txt Apr. 2001.

P.A. Smith, et al. Generalized MPLS Signaling-Functional Description. Network Working Group, Internet Draft, Document: draft-ietf-mpls-generalized-signaling- 03.txt Apr. 2001.

E. Rosen, et al. Multiprotocol Label Switching Architecture. Network Working Group, Request for Comments: 3031, Category: Standards Track Jan. 2001.

L. Anderson, et al. LDP Specification Network Working Group, Request for Comments: 3036, Category: Standards Track Jan. 2001.

* cited by examiner

*Primary Examiner*—John Pezzlo
(74) *Attorney, Agent, or Firm*—Katten Muchin Rosenman LLP

(57) ABSTRACT

In a label transfer network, an ingress node positioned at an upstream side end of a partial section of a first data transfer path (old path) transmits a path modify request, and an egress node positioned at a downstream side end of the partial section returns a label allocation request on a detour path (new path) to the ingress node in response to reception of the path modify request for implementing partial path modification from the old path to the new path. This enables the partial path modification with only a node bearing relation to the path modification, thus shortening the time needed for the path modification and suppressing an increase in extra control traffic for a node having no relation to the path modification.

53 Claims, 23 Drawing Sheets

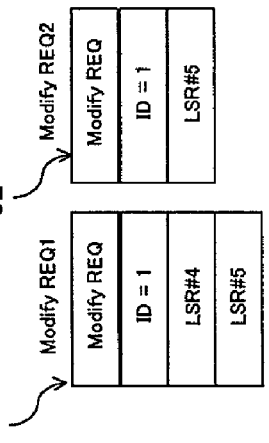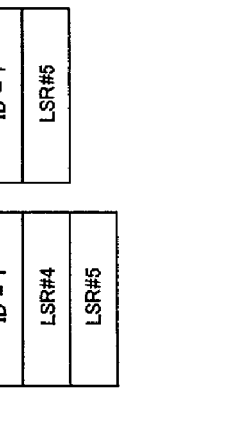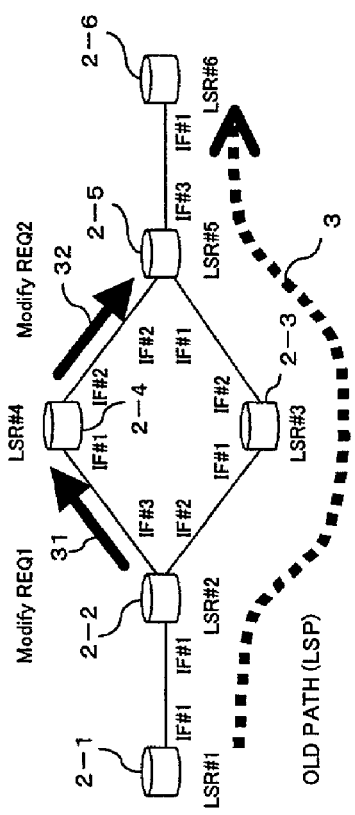

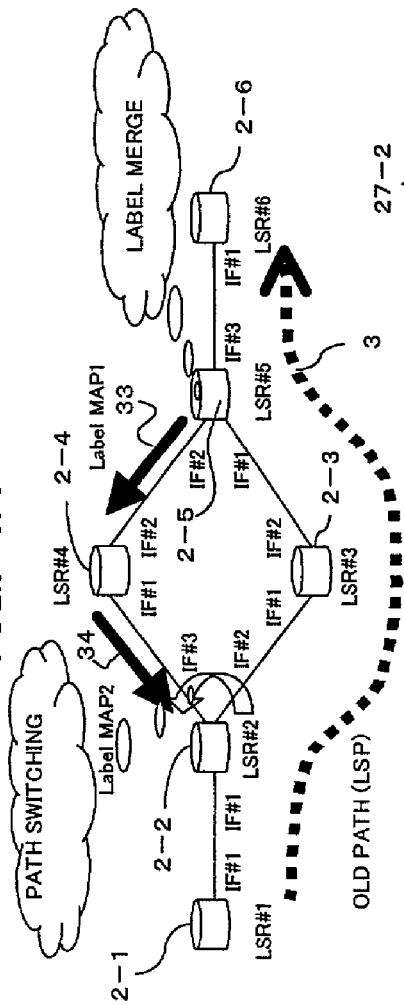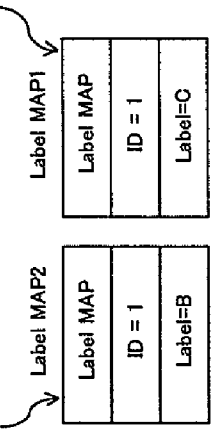

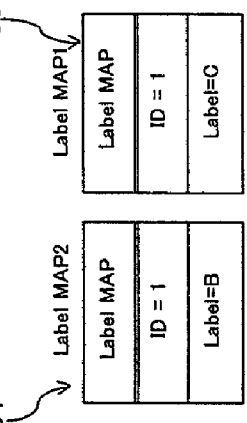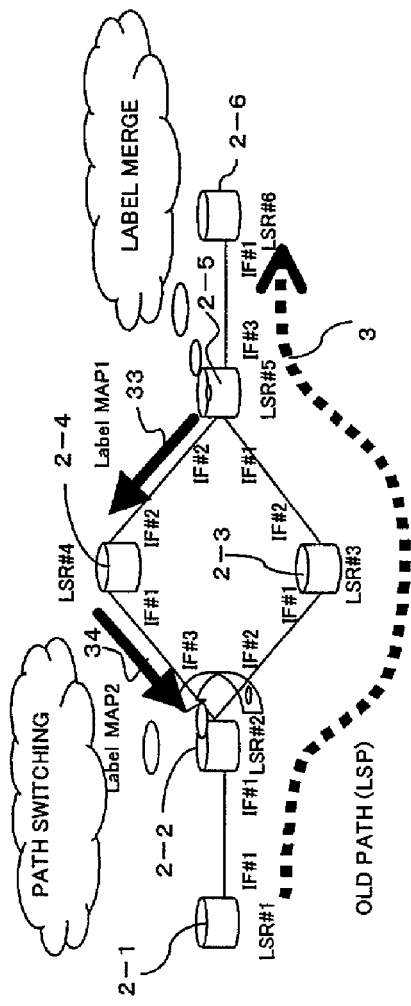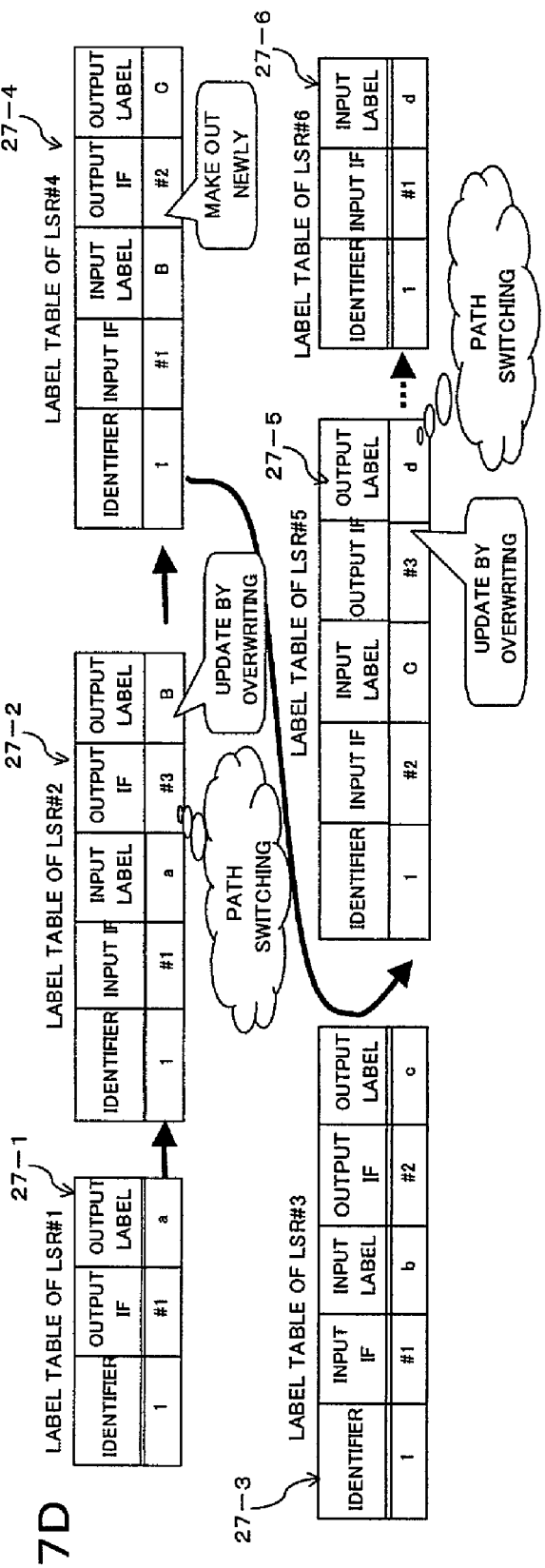

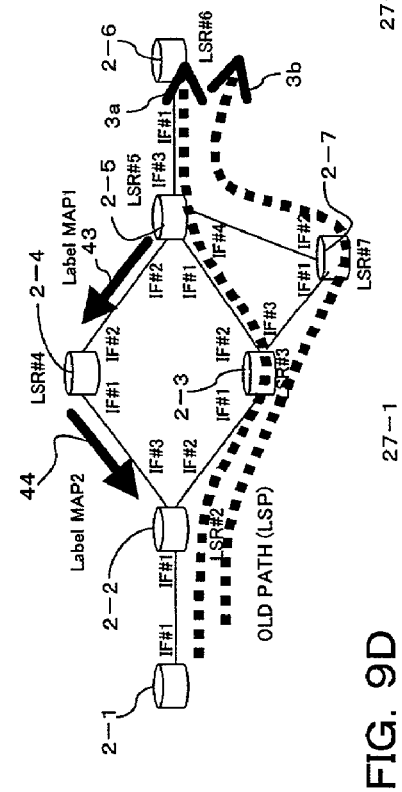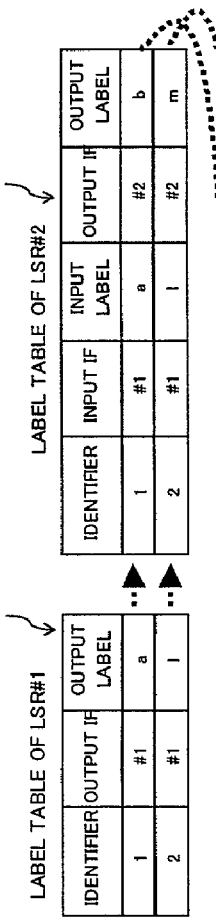
FIG. 9A
FIG. 9B
FIG. 9C
FIG. 9D

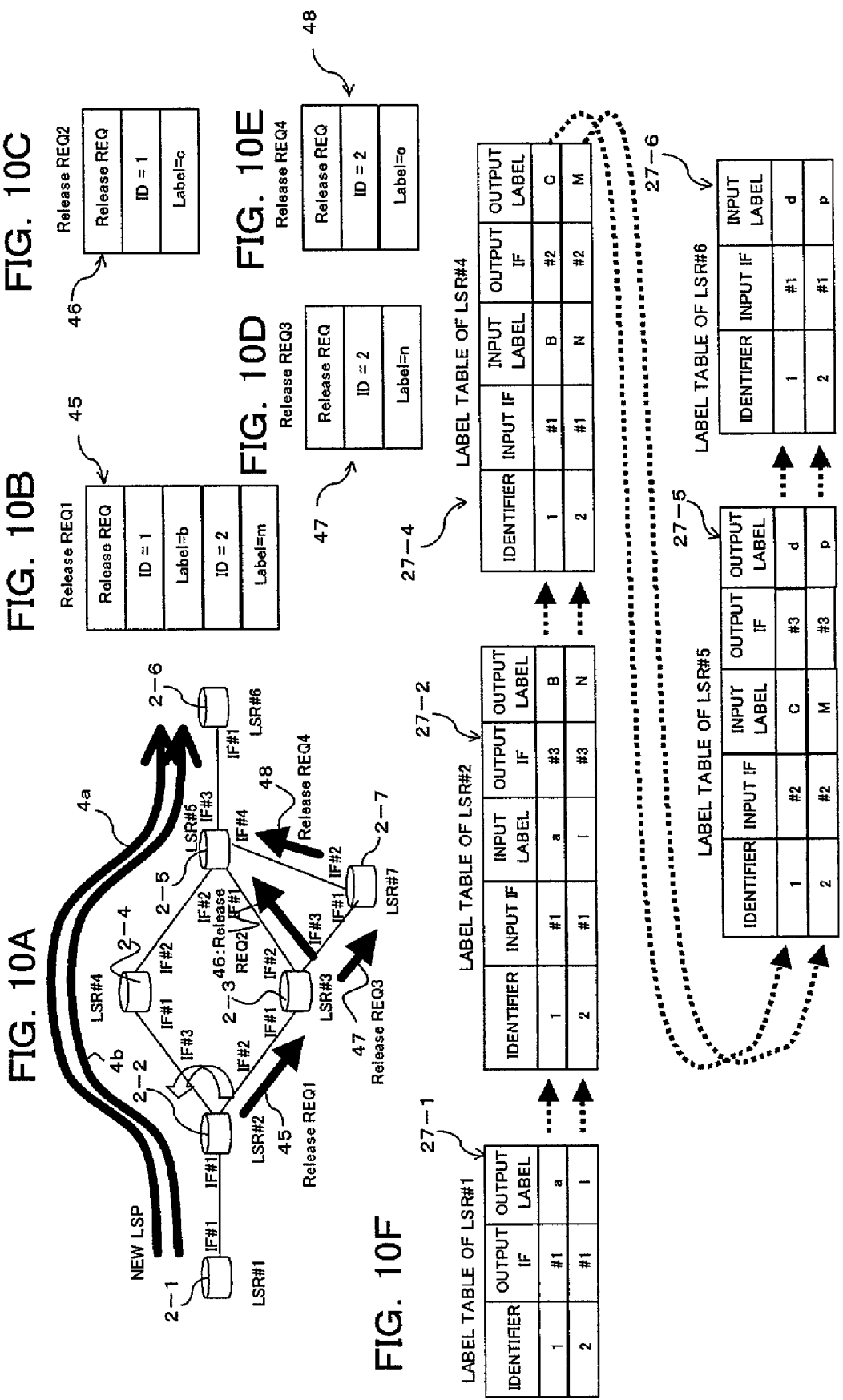

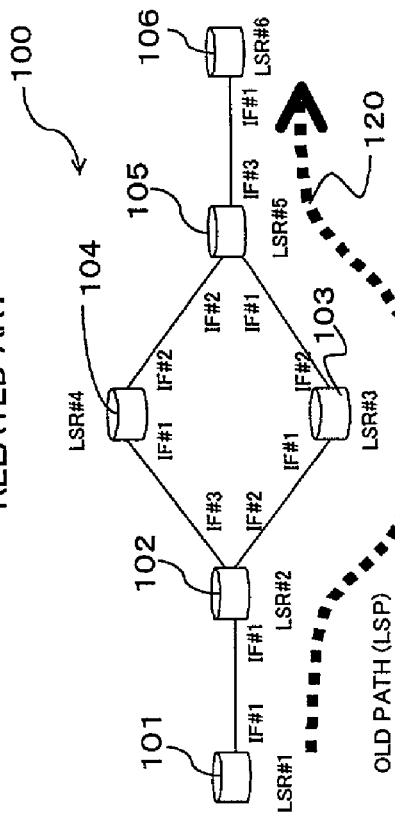
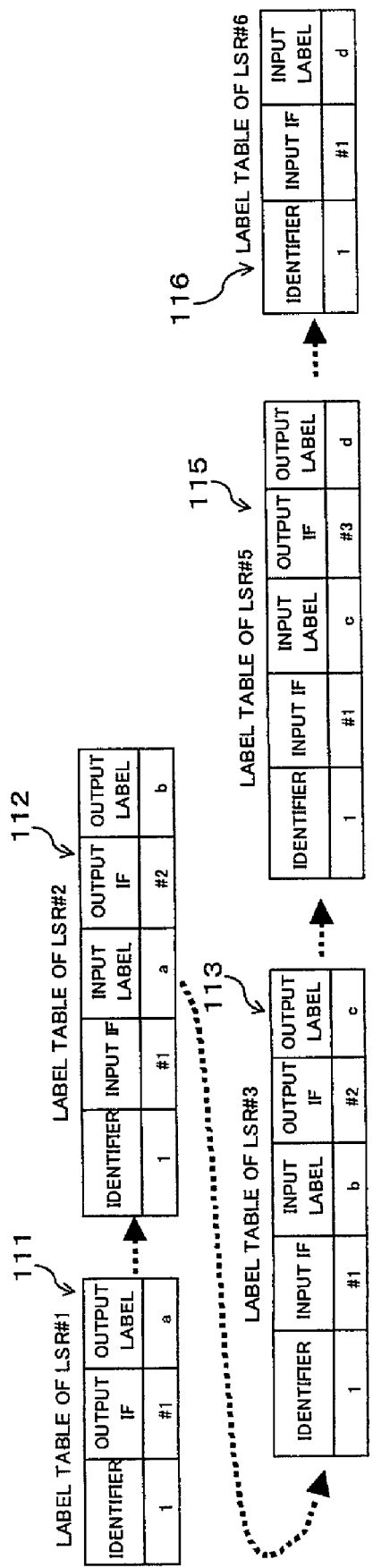
FIG. 20A RELATED ART
FIG. 20B RELATED ART

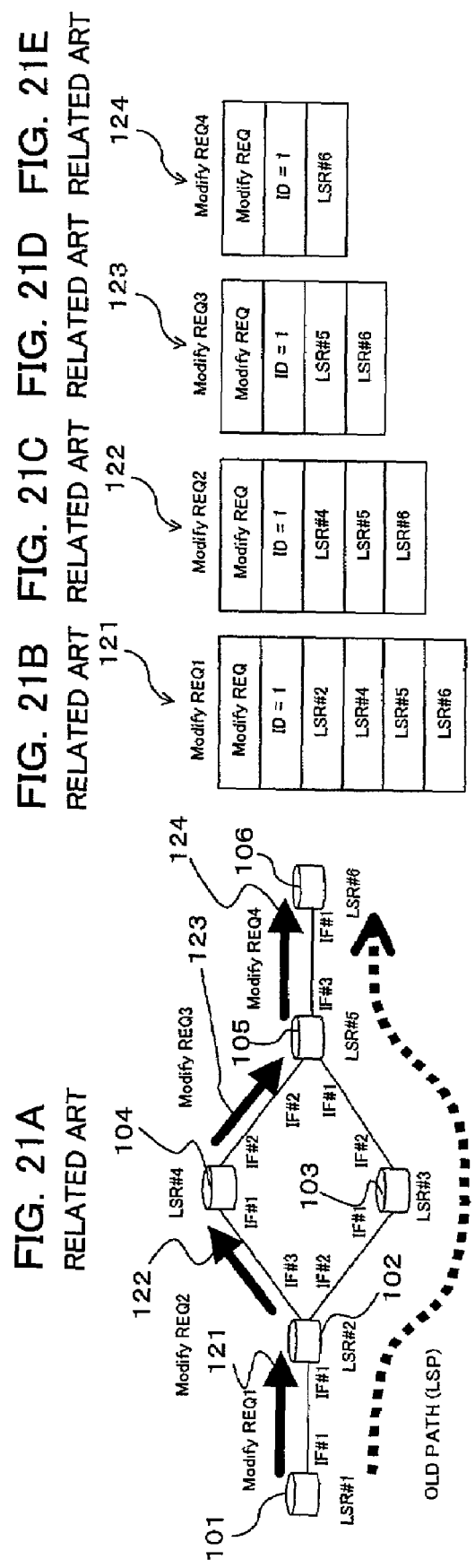

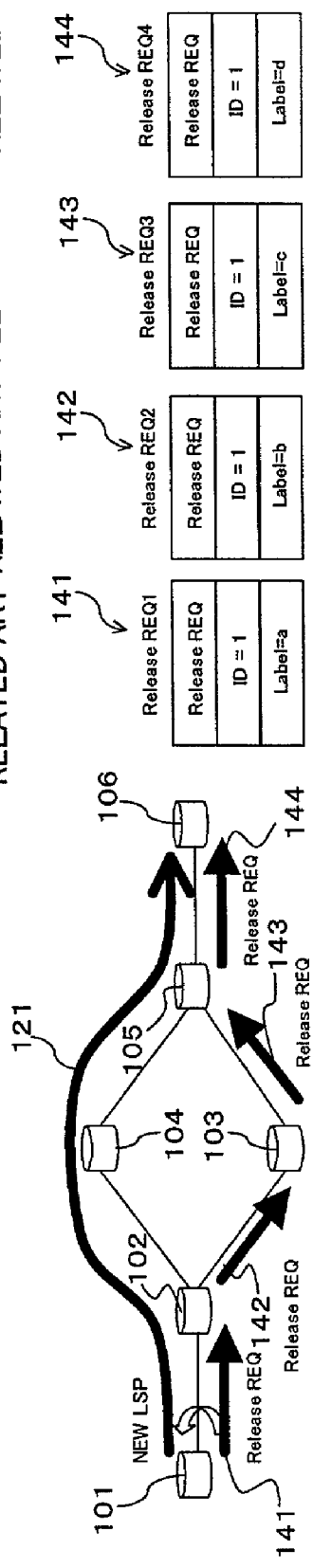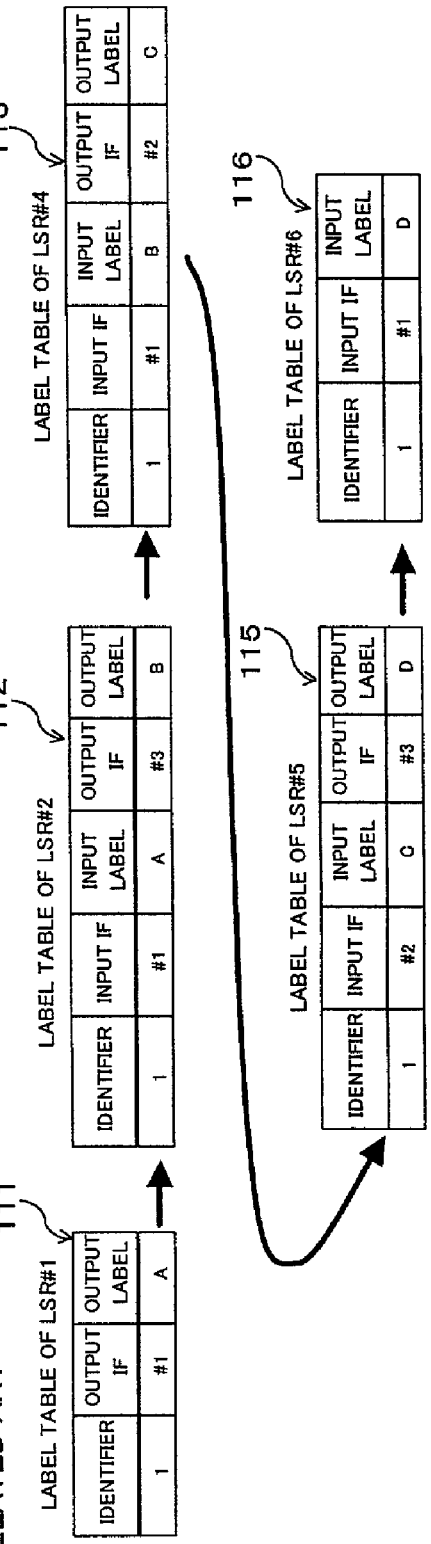

PATH MODIFYING METHOD, LABEL SWITCHING NODE AND ADMINISTRATIVE NODE IN LABEL TRANSFER NETWORK

BACKGROUND OF THE INVENTION (1) Field of the Invention

The present invention relates to a path (route) modifying method, label switching node and administrative (management) node in a label transfer network, and more particularly to a path modifying method, label switching node and administrative node suitable for use in a network based upon MPLS or GMPLS (Generalized MPLS).

(2) Description of the Related Art (1) MPLS

In the recent years, as a technique of, on a network, relaying (routing) communication data in the form of packet data (which will hereinafter be referred to simply as a "packet") at a high speed, much attention has been paid to a technology called "MPLS (Multi Protocol Label Switching). This "MPLS" is of a type transferring packets in accordance with fixed-length destination information (label information; which will hereinafter be referred to simply as "label") newly appendant (added) to a head of a packet in addition to a resident destination address therein.

Concretely, a router (LSR: Label Switching Router) functioning as a relaying device constituting a network (label transfer network; which will be referred to hereinafter as an "MPLS network") based on the "MPLS" retains a label table representative of the relationship between an input label, an input interfaces (IF) and an output label, an output IFs, and for packet relay, determines an output IF on the basis of an appendant label of a received packet without using a resident destination address thereof and converts (rewrite) the appendent label of the received packet into an output label.

Such an operation is repeatedly conducted in each of routers constituting the MPLS network, thereby transferring packets successively to a desired destination within the MPLS network. The aforesaid label is initially added in an input LSR (edge router) of the MPLS network.

Referring to FIG. 18, a more detailed description will be given hereinbelow of a packet relay method for use in such an MPLS network. In FIG. 18, reference numerals 101 to 104 represent routers (LSRs) organizing an MPLS network 100, and of these routers (which will hereinafter be referred to equally as "nodes") 101 to 104, each of the routers 101 and 104 serves as an edge router while each of the other routers 102 and 103 acts as a transit router.

First of all, the edge router 101 appends a label "a" to a received packet inputted to the MPLS network 100 and transfers this packet toward the next-hop (downstream side) router 102. Upon receipt of the packet with the label "a" from a specified input IF, the router 102 performs the retrieval (which will hereinafter be referred to as "label retrieval") on a label table 111, it retains, on the basis of identification information about that input IF (IF-ID; for example, IF-ID=#1) and the inputted label "a" as a retrieval key to determine/acquire the corresponding output IF and output label. In the case of FIG. 18, the router 102 provides the output IF "IF-ID=#2" and output label "b".

In addition, after the conversion of the input label "a" of the received packet into the output label "b" through the label retrieval as mentioned above, the router 102 transfers this packet through the output IF corresponding to "IF-ID=#2" to the next-hop router 103. As well as the aforesaid router 102, the router 103 determines and acquires an output IF ("IF-ID=#2") and output label ("c") respectively corresponding to the IF-ID (for example, IF-ID=#1) of the input IF, which has received the packet, and the label "b" appended to the received packet through the retrieval on a label table 112, and after the conversion of the label "b" of the received packet into the output label "c", it transfers this packet through the output IF "IF-ID=#2" toward the subsequent-stage router 104.

In this way, in the MPLS network 100, the packet received by the edge router 101 is transferred to the final-hop edge router (egress router) 104 while its label is rewritten in each of the transit routers 102 and 103. At this time, since each of the transit routers 102 and 103 conducts the transfer according to a fixed-length label, there is no need to calculate and determine the destination, to which the received packet is transferred, on the basis of a variable-length destination address, which enables fast packet relay.

(2) Label Distribution Protocol

In the case of the "MPLS", a label distribution protocol (CR-LDP: Constraint-based Routed Label Distribution Protocol) is employed for constructing the label tables 111 and 112 for use in the above-mentioned packet transfer system. That is, as illustratively shown in FIG. 19, for establishing a path (LSP: Label Switched Path) from the router 101 to the router 104, the edge (ingress) router (ingress node) 101 exiting at the starting point of the path transmits, to the next-hop router 102 lying on the path being established, a label request (Label REQ) 113 specifying (storing) identification information [node addresses (="LSR2", LSR3", "LSR4")] such as address information on a route up to the edge (egress) router (egress node) 104 forming the end point of the path (on the routers 102, 103 and 104 lying on the path to be established).

Upon receipt of this label request 113, the router 102 extracts its own node address (="LSR2") stored in this label request 113 and then transfers a label request 114 to the next-hop router 103 having a succeeding specified node address (="LSR3").

In like manner, the router 103 extracts its own node address (="LSR3") stored in the label request 114 and then transfers a label request 115 to the subsequent-hop router 104 having a further succeeding specified node address (="LSR4"). In this way, a label request issued from the ingress node 101 is transferred to the routers 102, 103 and 104 on the established path in a hop-by-hop manner.

Lastly, upon receipt of the label request 115, the edge node 104 recognizes the fact that it is the egress node because only its own node address (="LSR4") exists as the specified address in the label request 115, and transmits a message (label allocation request (Label MAP)) for label allocation as a reply to the ingress node 101.

For example, in the case of FIG. 19, the egress node 104 allocates "c" as a label (which is referred to as an "upstream side label") to be appended on the upstream side (router 103), and transmits a label allocation request 116 with the label "c" to the upstream side (router 103) through the input IF which has received the label request 115.

When receiving this label allocation request 116 through the output IF (IF-ID=#2) through which the router 103 has transferred the label request 115, the router 103 newly allocates "b" as an upstream side label and transmits the label request 114 to the upstream side (router 102) through the input IF (IF-ID=#1) which has received the label request 114.

In addition, at this time, the router 103 makes out the aforesaid label table 112 by associating the IF-ID=#1 on the input IF and the upstream side label "b" with the IF-ID=#2 on the output IF and a label (which is referred to as a "downstream side label") "c" allocated on the downstream side (the egress node 104).

In like manner, when receiving the aforesaid label allocation request 117 transmitted from the downstream side router 103, the upstream side router 102 newly allocates "a" as an upstream side label to transmit a label allocation request 118 with the allocated upstream side label "a" to the upstream side (ingress node 101), and makes out the aforesaid label table 111 by associating the IF-ID=#1 on the input IF and the upstream side label "a" with the IF-ID=#2 on the output IF and the downstream side label "b".

In this way, the label allocation requests (Label MAP) are successively transferred from the egress node 104, which has received a label request (Label REQ), to the upstream side, and when the label allocation request 118 is finally received by the ingress node 101, the required label tables 111 and 112 are made out in the transit nodes 102 and 103, thereby establishing a path from the ingress node 101 to the egress node 104.

(3) Path Modification in "MPLS"

As mentioned above, in the MPLS network 100, a path (LSP) from the ingress node 101 to the egress node 104 is established through the use of a signaling protocol represented by the aforesaid CR-LDP. With reference to FIGS. 20 to 23, a further description will be given hereinbelow of a method of modifying (changing) a path (LSP) established in this way.

For example, let it be assumed that, of routers 101 to 106 constituting an MPLS network 100, a path (LSP) 120 extending through the routers 101, 102, 103, 105 and 106 has already been established as shown in FIG. 20A while label tables 111, 112, 113, 115 and 116 have been made out and retained through the use of a signaling protocol such as the aforesaid CR-LDP in the routers 101, 102, 103, 105 and 106 as shown in FIG. 20B.

In the label tables 111 to 113, 115 and 116 shown in FIG. 20B, the "identifier" represents information (which will be referred to hereinafter as an "LSP ID") for identifying an LSP already established. That is, each of the routers 101 to 106 is made to manage the association (correspondence) between an input IF, an input label and an output IF, an output label according to LSP.

In this condition, in FIG. 20A, when the established LSP 120 is modified into a new LSP passing through the routers (nodes) 101, 102, 104, 105 and 106, a path modify request (Modify REQ) is transmitted through the new LSP to the egress node 106.

That is, as shown in FIGS. 21A and 21B, the ingress node 101 transmits, to the downstream side node 102, a path modify request (Modify REQ1) 121 having an LSP ID (in this case, "1" is taken provisionally) of the new LSP and node addresses (LSR#2, LSR#4, LSR#5, LSR#6) of the nodes 102, 104, 104 and 106 on the new LSP. Incidentally, the "path modify request" includes the same basic format as that of the above-mentioned label request (Label REQ), and flag information is set to indicate whether its own message is an ordinary label request for establishing a new path or the aforesaid path modify request.

Upon receipt of the path modify request 121, as in the case of the reception of the foregoing label request, the node 102 extracts its own node address (=LSR#2) from the received path modify request 121 to transfer a path modify request 122 (Modify REQ2) shown in FIG. 21C to the downstream side node 104 on the new LSP.

Following this, in like manner, a path modify request 123 (Modify REQ3) shown in FIG. 21D is transmitted from the node 104 on the new LSP to the node 105 thereon, and a path modify request 124 (Modify REQ4) shown in FIG. 21E is sent from the node 105 to the node 106. Upon receipt of the path modify request 124 at the egress node 106, as well as the case of establishing the LSP 120, the egress node 106 returns the above-mentioned label allocation request (Label MAP) to the upstream side node 105 on the new LSP.

That is, for example, as shown in FIGS. 22A and 22B, a label allocation request 131 (Label MAP1) having a route ID (=1) of the new LSP and a newly allocated label (label "D" different from the label "d" for the old LSP 120) is returned to the upstream side node 105. Upon receipt of this label allocation request 131, as shown in FIGS. 22A and 22C, the node 105 transmits, to the upstream side node 104, a label allocation request 132 (Label MAP2) having a route ID (=1) on the new LSP and a newly allocated label "C".

Thereafter, in like manner, a label allocation request 133 (Label MAP3) shown in FIG. 22D is transmitted from the node 104 to the node 102 as shown in FIG. 22A, and a label allocation request 134 (Label MAP4) shown in FIG. 22E is transmitted from the node 102 to the node 101 as shown in FIG. 22A.

In this way, the label allocation requests 131 to 134 are transferred on the new LSP in a hop-by-hop manner, and lastly, when the ingress node 101 receives the label allocation request 134, the label tables 111 to 116 the nodes 101 to 106 retain becomes in states shown in FIG. 22F.

That is, owing to the transmission of the above-mentioned label allocation requests 131 to 134, association information indicated by an oblique line portion in FIG. 22F are newly created in the nodes 101, 102, 104, 105 and 106 on the new LSP, and are placed (registered) in the label tables 111, 112, 114, 115 and 116, they retain, respectively.

Thus, as indicated by a solid-line arrow in FIG. 22F, the association information on the new LSP in the label tables 111, 112, 114, 115 and 116 in the nodes 101, 102, 104, 105 and 106 are linked with each other so that a new LSP 121 (see FIG. 23A) falls into an establishable condition. Incidentally, the link between the association information indicated by a dotted line in FIG. 22F is on the old LSP 120.

Following this, the ingress node 101 terminates (releases, that is, removes from the label table 111) the association information on the old LSP 120, and transmits a release request (Release REQ) along the old LSP 120. That is, for example, as shown in FIGS. 23A and 23B, the ingress node 101 transmits, to the downstream side node 102 on the new LSP 121, a release request (Release REQ1) 141 having a route ID (=1) of the old LSP 120 to be released and the released label "a".

Upon receipt of this release request 141, the node 102 removes the association information on the old LSP 120, specified by the received release request 141, from the label table 112, and transmits, to the downstream side node 104 on the new LSP 121, a release request (Release REQ2) 142 having a route ID (=1) of the old LSP 120 and the released label "b".

After this, in like manner, a release request (Release REQ3) 143 shown in FIG. 23D is transmitted from the node 103 to the node 105 as shown in FIG. 23A, while a release request (Release REQ4) 144 shown in FIG. 23E is forwarded from the node 105 to the egress node 106.

With the above-mentioned operations, only the association information on the new LSP 121 remain in the label tables 111, 112, 114, 115 and 116 of the nodes 101, 102, 104, 105 and 106, thus achieving a path modification (alteration) from the old LSP 120 to the new LSP 121 (see FIG. 23F).

However, in the case of the above-described conventional path modify method for use in the "MPLS", since a release request (Release REQ) is forwarded from the ingress node 101 to the egress node 106 after a path modify request (Modify REQ) is transmitted from the ingress node 101 to the egress node 106 and a label allocation request (Label MAP) is returned from the egress node 106 to the ingress node 101, even the nodes (in the above-mentioned examples, the nodes 101 and 106) having no relation to the path modification are involved in the transmission/reception of the path modify request (Modify REQ), the label allocation request (Label MAP) and the release request (Release REQ).

In consequence, a problem arises in that the path modification takes much time to cause a great delay until the path modification reaches completion. Add to it that extra control traffic to the nodes having no relation to the path modification comes into existence.

SUMMARY OF THE INVENTION

The present invention has been developed with a view to eliminating these problems, and it is therefore an object of the invention to enable a partial path modification with only nodes bearing relation to the path modification for shortening the time needed for the path modification and further to suppress the increase in extra control traffic to the nodes bearing no relation to the path modification.

For this purpose, in accordance with the present invention, there is provided a method of modifying a path in a label transfer network, comprising following steps:

(1) transmitting a path modifying request from an ingress label switching node positioned at an upstream side end of a partial section of a data transfer path to an egress label switching node positioned at a downstream end of the partial section via a detour path between said ingress label switching node and said egress label switching node; and (2) executing a partial path modification from said work path (hereinafter referred as a "old path") of the partial section to said detour path so as to use said detour path as a new data transfer path (hereinafter referred as a "new path") between said ingress label switching node and said egress label switching node, by returning a label allocation request for allocating new label information for said new path from said egress label switching node to said ingress label switching node in response to reception of said path modify request on said egress label switching node.

In this case, preferably, the ingress node allocates new label information (new downstream side label) for the downstream side in the new path upon receipt of the label allocation request, and implements the partial path modification by associating the new downstream side label with upstream side label information (existing upstream side label) already allocated with respect to the old path.

In addition, preferably, upon receipt of the path modify request, the egress node allocates new label information (new upstream side label) for the upstream side in the new path, and the new upstream side label and downstream side label information (existing downstream side label) already allocated with respect to the old path are associated with each other for implementing the partial path modification.

Still additionally, it is also appropriate that, in the egress node, each of the new upstream side label newly allocated upon receipt of the path modify request and the label information (existing upstream side label) for the upstream side in the old path already allocated is associated with the existing downstream side label already allocated with respect to the old path, and at the time of reception of a label release request on the old path, only the existing upstream side label for the old path is released for implementing the partial path modification.

Furthermore, in accordance with the present invention, the label switching node for use in the label transfer network is characterized by comprising the following means:

(1) path modify request transmitting means for transmitting a path modify request for a new data transfer path (new path) to a downstream side label switching node positioned on the new path;

(2) label allocation request receiving means for receiving a label information allocation request (which will be referred to hereinafter as a "label allocation request") on the new path made with respect to the path modify request from the downstream side label switching node;

(3) new downstream label allocating means for allocating new label information (new downstream side label) for the downstream side in the new path when the label allocation request receiving means receives the label allocation request; and (4) path modify control means for implementing a path modification from the old path to the new path by associating the new downstream side label allocated by the new downstream label allocating means with the upstream side label information (existing upstream side label) already allocated with respect to the data transfer path (old path) forming a path-modified object.

Still furthermore, in accordance with the present invention, the label switching node for use in the label transfer network is characterized by comprising the following means:

(1) path modify request receiving means for receiving a path modify request from an upstream side label switching node to itself for path modification into new data transfer path (new path);

(2) new upstream side label allocating means for allocating new label information (which will be referred to hereinafter as a "new upstream side label") for the upstream side in the new path when the path modify request is received by the path modify request receiving means;

(3) label allocation request transmitting means for transmitting a label allocation request for allocation of new label information on the new path to the upstream side label switching node; and (4) path modify control means for implementing a path modification from a data transfer path (old path) forming a modified object to the new path by associating the new upstream side label allocated by the new upstream label allocating means with the downstream side label information (existing downstream side label) already allocated with respect to the old path.

Moreover, it is also appropriate that the foregoing path modify control means includes the following components:

(1) a label merging section for making label mergence by associating each of label information for the upstream side in the new path newly allocated upon receipt of the path modify request and label information for the upstream side in the old path already allocated with downstream side label information already allocated with respect to the old path; and (2) a label merge releasing section for releasing only the label information for the upstream side in the old path at the time of the reception of a label release request on the old path to cancel the label mergence for implementing the partial path modification.

Still moreover, in accordance with the present invention, an administrative node for use in a label transfer network is characterized by comprising the following means:

(1) determining means for determining a first data transfer path (which will be referred to hereinafter as an "old path"), forming a path-modified object, and a second data transfer path (which will be referred to hereinafter as a "new path"), forming a modified-into path, on the basis of existing data transfer path information in the label transfer network and topology information on the label transfer network; and (2) path notifying means for notifying a label switching node (which will be referred to hereinafter as an ingress node) positioned at an upstream side end of a partial section of the old path determined by the determining means, of information about at least the new path, determined by the determining means, as a trigger for making the ingress node transmit a path modify request for partial path modification from the old path to the new path.

Furthermore, in accordance with the present invention, a path modifying method for use in a label transfer network is characterized by executing the following steps:

(1) a request transferring step in which a label switching node, when receiving one of a new path adding requestor a band width increasing request on an existing (already established) path, transfers this request to an administrative node;

(2) a new path confirming step in which, upon receipt of the request, the administrative node obtains a path (which will be referred to hereinafter as a "new path") to be established on the basis of the aforesaid topology and confirms whether or not a resource for a link on the new path is in an insufficient condition;

(3) a shifted-to path specifying step in which, when the resource is in the insufficient condition, the administrative node obtains one of new and existing optical paths as a shifted-to path from (a path to be switched from) an existing path passing through the link;

(4) a path modify signaling step in which, for path modification into the optical path forming the shifted-to path, the administrative node gives an instruction to a ingress node on the optical path for starting a path modify signaling;

(5) a path modifying step in which a node on a new path of the existing path processes the path modify signaling to implement the path modification and a node on the old path of the existing path processes the path modify signaling to cut off the existing path;

(6) a new path establishment signaling step in which the administrative node gives an instruction to a ingress node on the new path for activating a new path establishment signaling; and (7) a new path establishing step in which each of an ingress node, a transit node and an egress node on the new path processes the new path establishment signaling to establish the new path on a link released due to the path modification.

Furthermore, in accordance with the present invention, a path modifying method for use in a label transfer network is characterized by executing the following steps:

(1) a new path confirming step in which a label switching node, when receiving one of a new path adding requestor a band width increasing request on an existing path, obtains a path (which will be referred to hereinafter as a "newpath") to be established on the basis of a topology on the label transfer network and confirms whether or not a resource for a link on the new path is in an insufficient condition;

(2) a shifted-to path specifying step in which, when the resource is in the insufficient condition, the label switching node obtains one of new and existing optical paths as a shifted (switched)-to path from an existing path passing through the link;

(3) a path modify signaling step in which, for path modification into the optical path forming the shifted-to path, the label switching node gives an instruction to an ingress node on the optical path for starting a path modify signaling;

(4) a path modifying step in which a node on a new path of the existing path processes the path modify signaling to implement the path modification and a node on the old path of the existing path processes the path modify signaling to cut off the existing path;

(5) a new path establishment signaling step in which the label switching node gives an instruction to a ingress node on the new path for activating a new path establishment signaling; and (6) a new path establishing step in which each of a ingress node, a transit node and an egress node on the new path processes the new path establishment signaling to establish the new path on the link in which the resource is released due to the path modification.

Thus, the present invention provides the following advantages and effects.

(1) Since a partial path modification from a first data transfer path (old path) forming a path-modified object to a second data transfer path (new path) is achievable by only the transmission/reception of a path modify request and a label allocation request between an ingress node and an egress node which are positioned at both end portions of a partial section of the old path, the path modification becomes feasible while shortening the time needed for the path modification with respect to the time in a conventional technique, and the number of control messages to be transmitted/received is reducible to suppress an increase in extra control traffic for nodes bearing no relation to the path modification.

(2) Since an ingress node (egress node) receives a label allocation request for allocating a new downstream side label (new upstream side label) so that the partial path modification is implemented by associating that label with an existing upstream side label (existing downstream side label), the path modification is realizable with simple processing.

(3) Since the ingress node releases label information on the old path after the implementation of the partial path modification and transmits a label information release request (which will be referred to hereinafter as a "label release request") on the old path to a egress node, it is possible to securely release resources which have not been thought necessary to reside in a label switching node on the old path.

(4) Since the egress node is also capable of, when receiving the label release request, releasing the label information on the old path to cease (terminate) the transfer of the label release request to the downstream side, it is possible to further suppress the increase in extra control traffic for label switching nodes bearing no relation to the path modification.

(5) The partial batch path modification from a plurality of old paths to new paths becomes feasible, thus allowing a plurality of old paths to be modified into new paths collectively (in a batch manner). Accordingly, it is possible to release more resources at a time for allocating them to other new paths, and further to accomplish the fast switching between old paths and a new path.

(6) Since the ingress node releases label information on the plurality of old paths after the path modification on the plurality of old paths and transmits a label release request on the plurality of old paths toward a egress node, also in this case, it is possible to securely release the resources which have not been thought necessary to reside in the label switching nodes on the plurality of old paths.

(7) Since the egress node is capable of implementing the partial path modification in a manner that label mergence is made in a state where a new upstream side label and an existing upstream side label are associated with an existing downstream side label and the cancellation of the label mergence is made by releasing only the existing upstream side label for an old path at the time of the reception of a label release request on the old path, data loss is avoidable in transition to the path modification, and the path switching becomes possible with no instantaneous disconnection.

(8) Since the fact that a pertaining-to label switching node is a egress node which does not transfer (relay) a label release request, it receives from the upstream side, to the downstream side can easily be seized by storing, in a memory, the event that it has initially transmitted a label allocation request, or from whether the aforesaid label mergence has been made or not, it is possible to avoid releasing an old path on the downstream side of the pertaining-to node because the egress node does not transfer the label release request.

(9) In a case in which received data is transferred as an optical signal, if wavelength information on the optical signal is used as label information or if the received data is transferred in a state stored in a predetermined time slot, the above-mentioned partial path modification is applicable to optical networks or time division multiplexing communication networks in a manner that information on the time slot is used as the label information. This can offer the same effects as those mentioned above.

(10) In addition, the present invention enables a portion of an existing path on a link between some specific nodes to be replaced (shortcut) with an optical path at addition of a new path to create extra resources in that link for establishing a new path therein; therefore, it is possible to flexibly use properly the electrical data multiplexing for effective utilization of the network resources and the optical transmission for large-capacity transfer, which permits efficient network operations.

(11) In particular, if the above-mentioned control functions are centralized on an administrative node, the topology and resource information can be managed in the administrative node in a state centralized; accordingly, there is no need to establish the synchronism among a plurality of databases for the topology or resource information, and the control can always be executed on the basis of the latest topology/resource information.

(12) On the other hand, if the aforesaid control functions are decentralized to nodes, the path calculation at the path modification can be decentralized to the nodes, which enables less response degradation even if the requests such as new path addition requests and band increasing requests show a high frequency.

BRIEF DESCRIPTION OF THE DRAWINGS

FIGS. 3A to 3D are illustrations each useful for explaining a path modifying method (path modify request) for use in the MPLS network shown in FIG. 1;

FIGS. 4A to 4D are illustrations each useful for explaining a path modifying method (label allocation request and path modification) for use in the MPLS network shown in FIG. 1;

FIGS. 7A to 7D are illustrations each useful for explaining another path modifying method (label allocation request and path modification) for use in the MPLS network shown in FIG. 1;

FIGS. 9A to 9D are illustrations each useful for explaining a further example (label allocation at more-than-one-path modification) of a path modifying method for use in the MPLS network shown in FIG. 1;

FIGS. 10A to 10F are illustrations each useful for explaining another example (more-than-one-path modification and old path release) of a path modifying method for use in the MPLS network shown in FIG. 1;

FIGS. 20A and 20B are illustrations for explaining a conventional path modifying method for use in an MPLS network;

FIGS. 21A to 21E are illustrations for explaining a conventional path modifying method (path modify request) for use in an MPLS network;

FIGS. 22A to 22F are illustrations for explaining a conventional path modifying method (label allocation) for use in an MPLS network; and FIGS. 23A to 23F are illustrations for explaining a conventional path modifying method (path modification and old path release) for use in an MPLS network.

DESCRIPTION OF THE PREFERRED EMBODIMENTS

Embodiments of the present invention will be described hereinbelow with reference to the drawings.

(A) Description of Basic Embodiment

Figure 1:
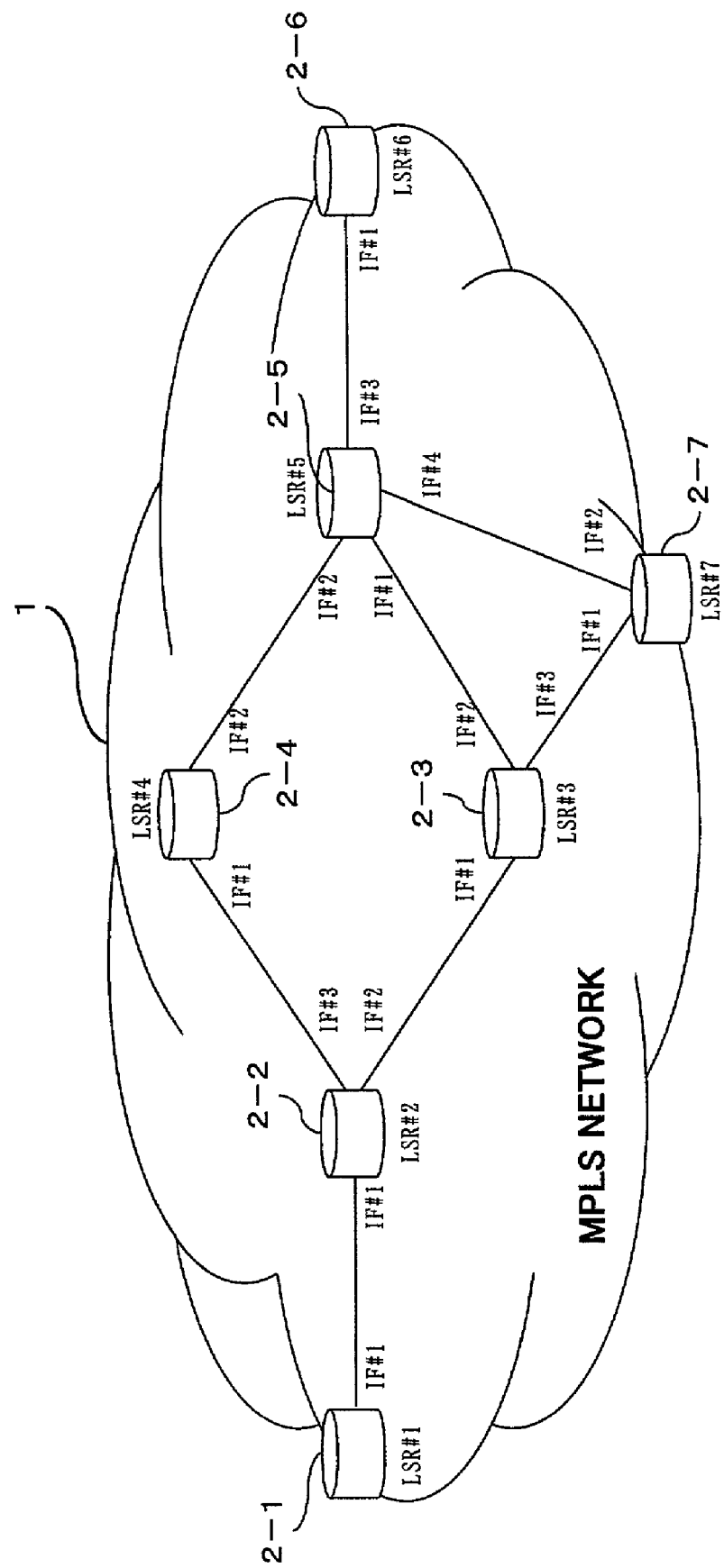
FIG. 1 is a block diagram showing one example of an MPLS network (label transfer network) according to a basic embodiment of the present invention.

FIG. 1 is a block diagram showing one example of an MPLS network (label transfer network) according to a basic embodiment of the present invention. In FIG. 1, an MPLS network 1 is made up of seven LSRs 2-1 to 2-7 each (which will hereinafter be equally referred to simply as a "node") serving as a label switching node. In this illustration, each of LSR#1 to LSR#7 denotes identification information (node address) on the LSR 2-i (where i represents 1 to 7), and each of IF#1 to IF#4 depicts identification information (IF-ID) on an interface (port) of the LSR 2-i.

That is, in the configuration shown in FIG. 1, for example, the LSR 2-1 and the LSR 2-2 are connected to each other through an interface (port) identified by IF-ID=IF#1, and the LSR 2-2 and the LSR 2-3 are connected to each other through an interface identified by IF-ID=IF#2 and pertaining to the LSR 2-2 and an interface identified by IF-ID=IF#1 and pertaining to the LSR 2-3. The other connections are made in like manner.

Figure 2:
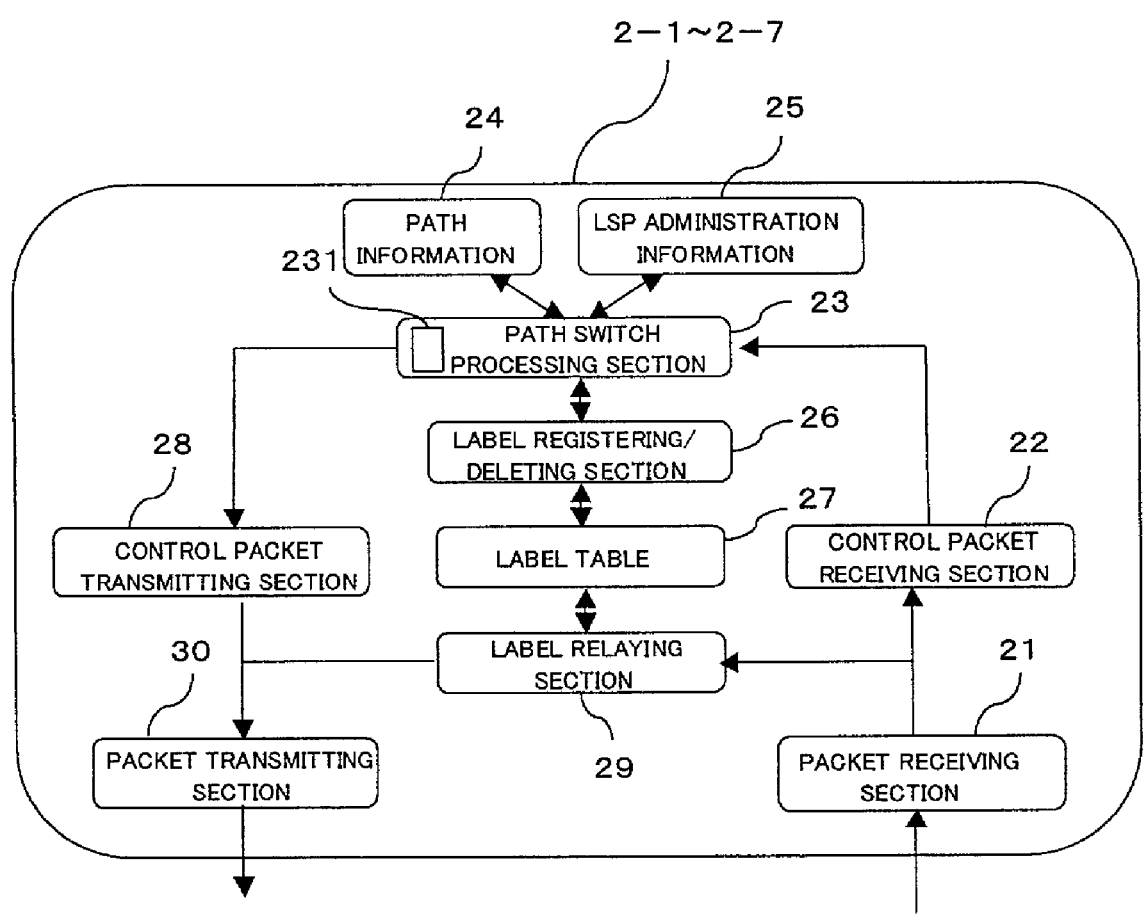
FIG. 2 is a block diagram showing a configuration of an LSR in the MPLS shown in FIG. 1.

In this embodiment, for example, as FIG. 2 shows, each of the LSRs 2-i is composed of a packet receiving section 21, a control packet receiving section 22, a path modify processing section 23, a path information memory 24, an LSP administration memory 25, a label registering/deleting section 26, a label table memory 27, a control packet transmitting section 28, a label relaying section 29 and a packet transmitting section 30.

In this configuration, the packet receiving section 21 is for receiving packet data (which will hereinafter be referred to simply as a "packet"), to which a label is appended, inputted from the upstream side in an LSP, and the control packet receiving section 22 is for receiving various types of control (signaling) messages including a path modify request (Modify REQ), a label allocation request (Label MAP), a label release request (Release REQ), and a notification message (Notification MSG), directed to itself. Incidentally, Packets (including a user packet) other than those directed to itself are to be processed in the label relaying section 29.

The path modify processing section 23 is for conducting processing according to the control (signaling) messages (packets) such as the path modify request (Modify REQ), the label allocation request (Label MAP), the label release request (Release REQ), and the notification message (notification), received by the aforesaid control packet receiving section 22, and in this embodiment, it is capable of conducting the following processing.

(1) In a case in which a pertaining-to node 2-i forms an upstream side switching end (ingress node) in a partial (middle) section to be path (LSP)-switched (modified), the path modify processing section 23 transmits a path modify request (Modify REQ).

(2) In a case in which a pertaining-to node 2-i forms a downstream side switching end (egress node) on the downstream side in the en route section, upon receipt of a path modify request (Modify REQ), it returns a label allocation request (Label MAP) to the upstream side, and upon reception of a label release request (Release REQ), terminates the label release request (Release REQ) to cease the transfer (relay) thereof to the downstream side.

(3) In a case in which a need for registration/deletion of a label takes place, it gives an instruction to the label registering/deleting 26. The label registration occurs for the reception of a label allocation request (Label MAP) while the label deletion occurs for the reception of a label release request (Release REQ).

(4) It determines a node 2-i, where control messages (Modify REQ, Label MAP, Release REQ, Notification, and others) is to be sent, on the basis of path information retained in the path information memory 24 and LSP administration information stored in the LSP administration information memory 25, and after creating a control packet, sends this control packet to the control packet transmitting section 28. At this time, a plurality of control messages (packets) are created as needed and forwarded to the control packet transmitting section 28.

Furthermore, the path information memory 24 is for retaining path information (path table) produced on the basis of a network topology [administrative information about a configuration (connection arrangement) of a network], and through the use of this path table, it shows the path modify processing section 23 a node 2-i to be used for forwarding a packet to some destination and, when needed, an output IF which is to output the packet.

The LSP administration information memory 25 is for retaining, for example, addresses of, of the nodes 2-i on the LSP, the nodes in a previous part (on the upstream side) and the nodes thereof in a latter part (on the downstream side) as LSP administration information, and on the basis of this LSP administration information, the path modify processing section 23 determines a node to which forwarded are a control packet (Modify REQ, Label MAP, Release REQ, Notification, and others).

The label registering/deleting section 26 is for securing a necessary label in accordance with an instruction from the path modify processing section 23 to register it in the label table memory 27. For example, as will be mentioned later, in a case in which an ingress node 2-i performs the label registration, the label registering/deleting section 26 registers (associates) a new downstream side label with respect to an existing upstream side label, and in a case in which a egress node 2-i performs the label registration, it registers an existing downstream side label with respect to a new upstream side label.

The label table memory 27 is for storing information (correspondence information) representative of an output IF and output label corresponding to an input IF and input label according to LSP [identifier for specifying an LSP (LSP-ID; route ID) and for retaining data (label table) in the form of a table. In the following description, for convenience in description, a "label table" retained in the label table memory 27 is sometimes mentioned as a "label table 27", and when the label tables 27 in the nodes 2-1 to 2-7 are distinguished from each other, they are mentioned as the label tables 27-1 to 27-7.

Furthermore, in FIG. 2, the control packet transmitting section 28 is for transferring a control packet, issued from the path modify processing section 23, to the packet transmitting section 30, and the label relaying section 29 is for determining an output IF and an output label for a received packet in accordance with the label table 27 and for appending a label to the received packet or for updating the label before transferring the resultant packet to the packet transmitting section 30. This packet transmitting section 30 is for transmitting the packets transferred from the control packet transmitting section 28 and the label relaying section 29 through the output IF determined by the path modify processing section 23 or the label relaying section 29.

A detailed description will be given hereinbelow of an operation of the MPLS network 1 (nodes 2-i) thus constructed according to this embodiment.

(A1) Path Modify Procedure in One LSP

First of all, the description starts at a case in which one LSP is switched (modified) to another new LSP. In this case, in this embodiment, a path modify request (Modify REQ) and a label allocation request (Label MAP) are interchanged only in a portion between both end nodes 2-i of a partial section of a path being a path-modified object to establish a new path and the label association is changed in each of both the end nodes 2-i, thereby realizing the path modification by the replacement between the old and new LSPs. A detailed description thereof will be given hereinbelow.

As FIG. 3A shows, let it be assumed that an LSP 3 (LSR#1→LSR#2→LSR#3→LSR#5→LSR#6) (first data transfer path), in which a node 2-1 serves as a ingress node while a node 2-6 acts as an egress node, has already been established by the setting label table 27 for each of the nodes 2-1, 2-2, 2-3, 2-5 and 2-6, the node 2-1 by the CR-LDP or manually. Furthermore, let it be assumed that the registration contents of the label tables 27-1, 27-2, 27-3, 27-5 and 27-6 and the relationship in link for the LSP 3 are, for example, as shown in FIG. 3D. Incidentally, in FIG. 3A, a node 2-7 is omitted from the illustration (also omitted in FIGS. 4A, 5A and 6A).

In a case in which the LSP 3 is modified into a new LSP (second data transfer path; new path) 4 (see FIG. 5A) which, for example, goes through the nodes 2-1, 2-2, 2-4, 2-5 and 2-6, due to a variation of network situation such as the occurrence of trouble or the occurrence of congestion or circumstances on administration such as construction work, in this embodiment, there is transmitted a path modify request (Modify REQ) from an upstream side node (ingress node) 2-2 existing at an end of the switching section being modified to a downstream side node (egress node) 2-5 existing at an end of the switching section, which lie along the new path 4.

Concretely, for example, as FIG. 3B shows, the ingress node 2-2 produces, through the use of the path modify processing section 23, a path modify request (Modify REQ1) 31 including an identifier (LSD-ID) of the LSP 3 forming a modified object and node addresses (LSR#4, LSR#5) of the passing-through nodes 2-4 and 2-5 lying on the new path 4, and transmits it through the control packet transmitting section 28 and the packet transmitting section 30 to the next (downstream side) node on the new path 4, i.e., the node 2-4.

That is, a part comprising the control packet transmitting section 28 and the packet transmitting section 30 in the ingress node 2-2 functions as a path modify request transmitting section to transmit the path modify request 31 for the new path 4 to the downstream side node 2-4 situated on the new path 4. An instruction (trigger) for the ingress node 2-2 to transmit the path modify request 31 (for the activation of path modify signaling) is given by a route server acting as an administrative node or another node 2-i serving as an administrative node as will be mentioned later.

In the node 2-4, when receiving the aforesaid path modify request 31, the path modify processing section 23 derives the pertaining-to node address (LSR#4) from this path modify request 31, and as a result, transmits a path modify request (Modify REQ2) 32 (see FIG. 3C), including the LSP-ID of the modified object and the node address (LSR#5) of the passing-through node 2-5 on the new path 4, to the next node on the new path 4, i.e., the node 2-5, as shown in FIG. 3A.

In the node 2-5, when receiving this path modify request 32, the path modify processing section 23 recognizes the pertaining-to node 2-5 being at the endmost position (downstream side end) of the new path 4, by confirming the fact that only its own address (LSR#5) exists as the node address stored in the path modify request 32. Thus, this egress node 2-5 issues a label allocation request (Label MAP) for allocating a label to the new path 4, with this label allocation request being transmitted for the ingress node 2-2 in the opposite direction along the path through which the path modify request 31 (32) has moved.

That is, in the egress node 2-5, when the aforesaid path modify request 32 reaches the path modify processing section 23 through the packet receiving section 21 and the control packet receiving section 22, the path modify processing section 23 newly allocates an upstream side label (for example, C) for the new path 4 in relation to the LSP 3 (which will be referred to hereinafter as an "old path 3") designated with the path modify request 32.

Along with this, the path modify processing section 23 issues an instruction to the label registering/deleting section 26; therefore, the label registering/deleting section 26 additionally registers the association (correspondence information) between a new upstream side label (=C), an input IF [input IF (IF-ID=#2) which has received the path modify request 32] and an existing downstream side label (=d) of the old path 3, an output IF (IF-ID=#3) in a state where the existing association (correspondence information) on the old path 3 is left in the label table 27-5 (see FIG. 4D).

With this, in the egress node 2-5, there are set the association between the input IF (IF-ID=#2), existing upstream side label (=c) and the output IF (IF-ID=#3), existing downstream side label (=d) and the association between the input IF (IF-ID=#2), new upstream side label (=C) and the output IF (IF-ID=#3), existing downstream side label (=d).

Thus, in a manner that the input labels on a plurality of LSPs are associated with one output label on the existing LSP (which is referred to as "label merge or label mergence), the old path 3, together with the new path 4, becomes effective even in the transition to the path switching; therefore, packet loss is avoidable in the transition to the path switching and path switching is realizable with no disconnection.

That is, the path modify processing section 23 in the egress node 2-5 functions as a label-merging section to, upon receipt of the path modify request 32, associate each of the new upstream side label (=C) newly allocated and the existing upstream side label (=c) on the old path 3 already allocated, with the existing downstream side label (=d) already allocated with respect to the old path 3, thereby conducting the label mergence.

Furthermore, in the egress node 2-5, as FIG. 4A shows, the path modify processing section 23 issues a label allocation request (Label MAP1) 33 (see FIG. 4C) accommodating a new upstream side label (=C) and an LSP-ID (=1) through the control packet transmitting section 28 and the packet transmitting section 30 to the previous-stage (upstream side) node 2-4 on the new path 4.

That is, in the egress node 2-5, the packet receiving section 21 and the control packet receiving section 22 function as a path modify request receiving section to receive a path modify request for the new path 4 sent from the upstream side node 2-4 and directed to itself, while the control packet transmitting section 28 and the packet transmitting section 30 function as a label allocation request transmitting section to transmit, to the upstream side node

2-4, a label allocation request which makes a request for the allocation of a new label on the new path 4.

In addition, in this case, when the aforesaid path modify request receiving section 21, 22 receives the path modify request 32, the path modify processing section 23 functions as a new upstream label allocating section to allocate new label information (new upstream side label) for the upstream side in the new path 4.

Still additionally, a part comprising the path modify processing section 23 and the label registering/deleting section 27 function as a path modify control section to implement the path modification from the old path 3 to the new path 4 by associating the new upstream side label allocated by the new upstream label allocating section with the downstream side label information (existing downstream side label) already allocated to the packet transfer path (old path) 3 forming a path-modified object.

In the node 2-4, upon receipt of the aforesaid label allocation request 33, the path modify processing section 23 allocates, as a downstream side label, the label (=C) put in the received label allocation request 33, and newly allocates an upstream side label (for example, B), while in accordance with an instruction from the path modify processing section 23, the label registering/deleting section 26 newly registers these upstream side label (=B) and downstream side label (=C) in the label table 27-4 (see FIG. 4D) and associates them.

In this connection, at this time, the input IF (IF-ID=#1) which has received the path modify request is registered for the input IF for the upstream side label (=B), and the IF (IF-ID=#2) which has received the label allocation request 33 is registered for the output IF for the downstream side label (=C).

Moreover, in the node 2-4, as FIG. 4A shows, the path modify processing section 23 further issues a label allocation request (Label MAP2) 34 (see FIG. 4B) accommodating the new upstream side label (=B) newly allocated and the LSP-ID (=1) of the old path 3 to the previous-hop node 2-2 on the new path 4.

When the ingress node 2-2 which has transmitted the first path modify request 31 receives the label allocation request 34 through the packet receiving section 21 and the control packet receiving section 22, in this node 2-2, the path modify processing section 23 allocates, as a downstream side label for the new path 4, the label (=B) placed in the label allocation request 34, while the label registering/deleting section 26 registers the aforesaid new downstream side label (=B) in the label table 27-2 (see FIG. 4D) [changes the existing downstream side label (=b), already allocated with respect to the old path 3 (existing upstream side label=a), to the aforesaid new downstream side label (=B) in an overwriting manner].

In this connection, at this time, the output IF for the new downstream side label (=B) is changed to the IF (IF-ID=#3), which has received the label allocation request 34, in an overwriting manner. Accordingly, the path switching in the ingress node 2-2 from the old path 3 to the new path 4 (see FIG. 5A) is realizable with simple processing, i.e., with a change of the label association.

That is, in the ingress node 2-2, the packet receiving section 21 and the control packet receiving section 22 function as a label allocation request receiving section to receive, from the downstream side node 2-4, the label allocation request 34 on the new path 4 to the path modify request 31, while the path modify processing section 23 functions as a new downstream label allocating section to allocate a new downstream side label for the new path 4 when the aforesaid label allocation request receiving section receives the label allocation request 34.

Still moreover, the path modify processing section 23 and the label registering/deleting section 26 function as a path modify control section to implement the partial path modification from the old path 3 to the new path 4 by associating the new downstream side label (=B) allocated by the aforesaid new downstream label allocating section with the existing upstream side label (=a) already allocated with respect to the old path 3.

Figure 5C:
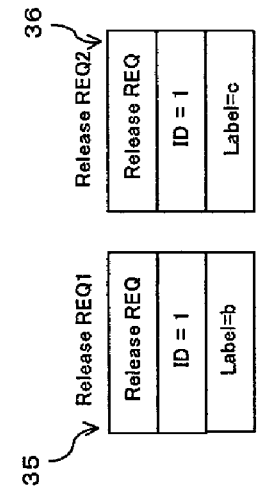
FIGS. 5A to 5D are illustrations each useful for explaining a path modifying method (old path release) for use in the MPLS network shown in FIG. 1.
Figure 5B:
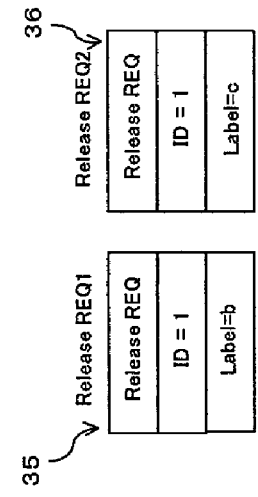
Figure 5A:
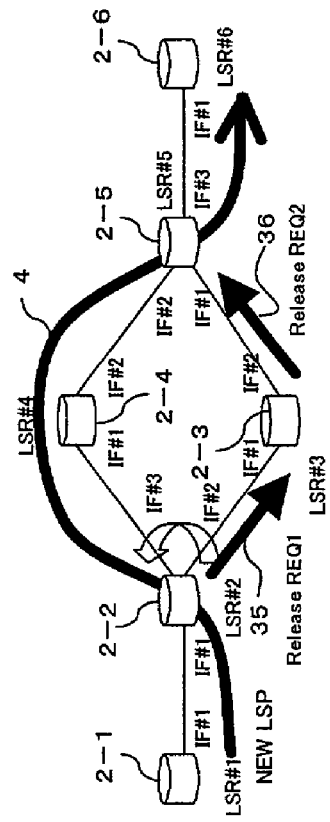
Figure 5D:
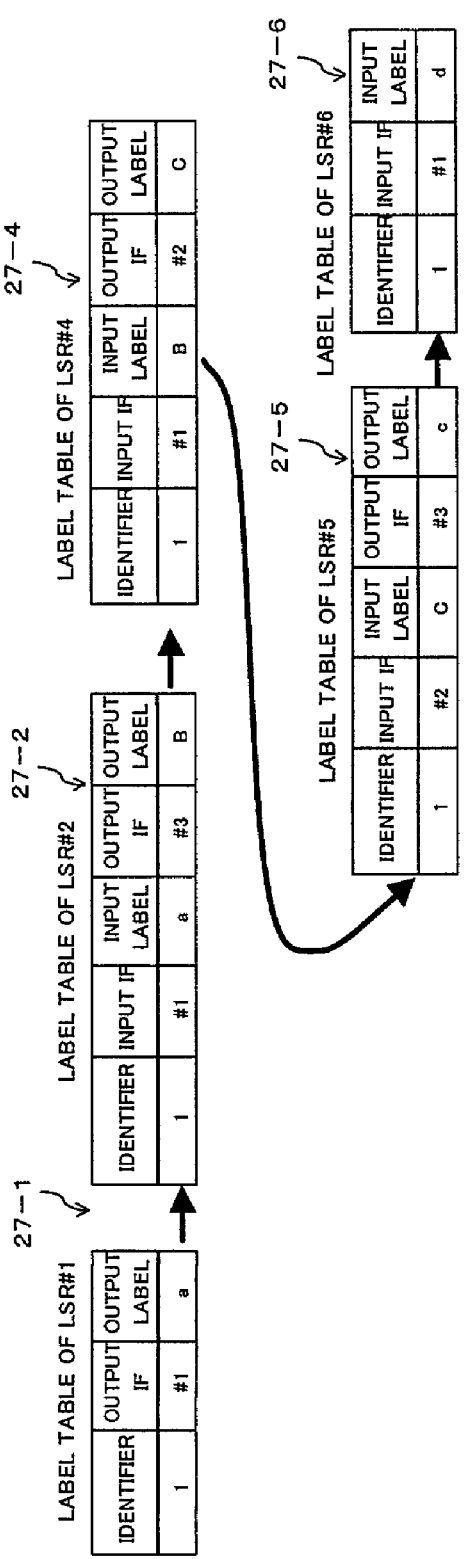

After the foregoing switching from the old path 3 to the new path 4, the ingress node 2-2 transmits a label release request (Release REQ) through the old path 3 to the egress node 2-5 for the purpose of releasing the label resources on the old path 3. That is, in the ingress node 2-2, the path modify processing section 23 releases the downstream side label (b) of the old path 3, and as FIG. 5A shows, issues (produces/transmits) a label release request (Release REQ1) 35 to the downstream side node 2-3 on the old path 3. For example, as FIG. 5B shows, this label release request 35 includes an identifier (LSP-ID) of the old path 3 forming the label released object and the label (=b) released by the pertaining-to node 2-2 (an upstream side label to be released by the next node 2-3).

That is, in the ingress node 2-2, the path modify processing section 23 functions as a label release request issuing section to, after associating the existing upstream side label (=a) with the new downstream side label as stated above, release the existing downstream side label (=b) of the old path 3 from the allocated condition and further to issue a label release request 35 to the downstream side node 2-3 positioned on the old path 3.

In the node 2-3, when receiving the aforesaid label release request 35, the path modify processing section 23 releases the upstream side label (=b) designated by the label release request 35 and the downstream side label (=c) of the old path 3, and issues a label release request (Release REQ2) 36 to the next node 2-5 on the old path 3. This label release request 36 includes an identifier (LSP-ID) of the old path 3 forming the label-released object and the label (=c) released by the pertaining-to node 2-3 (the upstream side label to be released by the next node 2-5).

Upon receipt of this label release request 36, in the egress node 2-5, the label registering/deleting section 26 deletes (releases from the "label mergence") the correspondence information [the association between the input IF (IF-ID=#1), existing upstream side label (Label=c) and the output IF (IF-ID=#3), existing downstream side label (Label=d); an entry at the upper section of the label table 27-5 shown in FIG. 4D] retained in the label table 27-5 through the use of the "label mergence" without being deleted, and releases the upstream side label (=c) designated by the received label release request 36, thus accomplishing the path switching from the old path 3 to the new path 4.

That is, in the egress node 2-5, the label registering/deleting section 26 functions as a label merge canceling section to cancel the aforesaid "label mergence" by releasing only the upstream side label on the old path 3 at the time of the reception of the label release request 36 on the old path 3 for implementing the partial path modification from the old path 3 to the new path 4.

In this way, when the label release requests 35 and 36 are relayed (routed) on the old path 3, it is possible to securely release the label resources which have not been thought necessary to reside in the nodes 2-2, 2-3 and 2-5 on the old path 3.

In this connection, upon receipt of the aforesaid label release request 36, the node 2-5 recognizes that it is the egress node, in a manner that, for example, information (transmission indicating information) representative of the node which has initially transmitted the label allocation request 33 is stored in a memory 231 (see FIG. 2) of the path modify processing section 23, or the like, and terminates the received label release request 36 to cease the relay toward the downstream side (node 2-6).

That is, in the egress node 2-5, the path modify processing section 23 functions as a label release request transfer judging section to, when receiving the label release request 36 on the old path 3 from the upstream side node 2-3, make a decision on whether or not the label release request 36 is to be transferred to the downstream side (node 2-6) of the old path 3, while this label release request transfer judging section functions as the following parts:

(1) a memory 231 for storing the transmission indicating information representative of the fact that the aforesaid label allocation request transmitting section (the control packet 28 and the packet transmitting section 30) has initially transmitted the label allocation request 31; and (2) a label release request terminating section for, when the aforesaid transmission indicating information is stored in the memory 231 at the reception of the label release request 36, recognizing that it is a node positioned at the downstream side end of a partial section of the path-modified object, thus terminating the label release request 36 without transferring it to the downstream side in the old path 3.

It is also appropriate that the decision as to whether or not the aforesaid label release request 36 is to be transferred to the downstream side is made on the basis of whether a plurality of entries exist in the label table 27-5 of the egress node 2-5 through the aforesaid "label-mergence". That is, it is also appropriate that the aforesaid label release request transfer judging section functions as the following parts:

(1) a label merge judging section for making a decision on whether the aforesaid label mergence is made or not; and (2) a label release request terminating section for, when the label merge judging section makes a decision that the "label mergence" is already made upon receipt of the label release request 36, recognizing that the node it pertains to is a node positioned at a downstream side end of a partial section of the path-modified object and terminating the label release request 36 without transferring it to the downstream side in the old path 3.

In either case, the fact that the pertaining-to node is a egress node which does not transfers (relays) the label release request 36 received from the upstream side to the downstream side is easily recognizable by means of the first transmission of the label allocation request 31 being stored in the memory 231 or on the basis of whether the aforesaid "label mergence" is made or not; therefore, the release of the old path 3 on the downstream side of the pertaining-to node 2-5 is avoidable in a manner that the egress node 2-5 does not transfer a label release request.

Figure 6B:
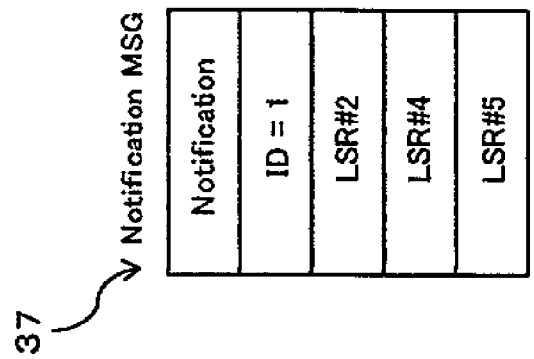
FIGS. 6A and 6B are illustrations each useful for explaining a path modifying method (path modify information notification) for use in the MPLS network shown in FIG. 1.
Figure 6A:
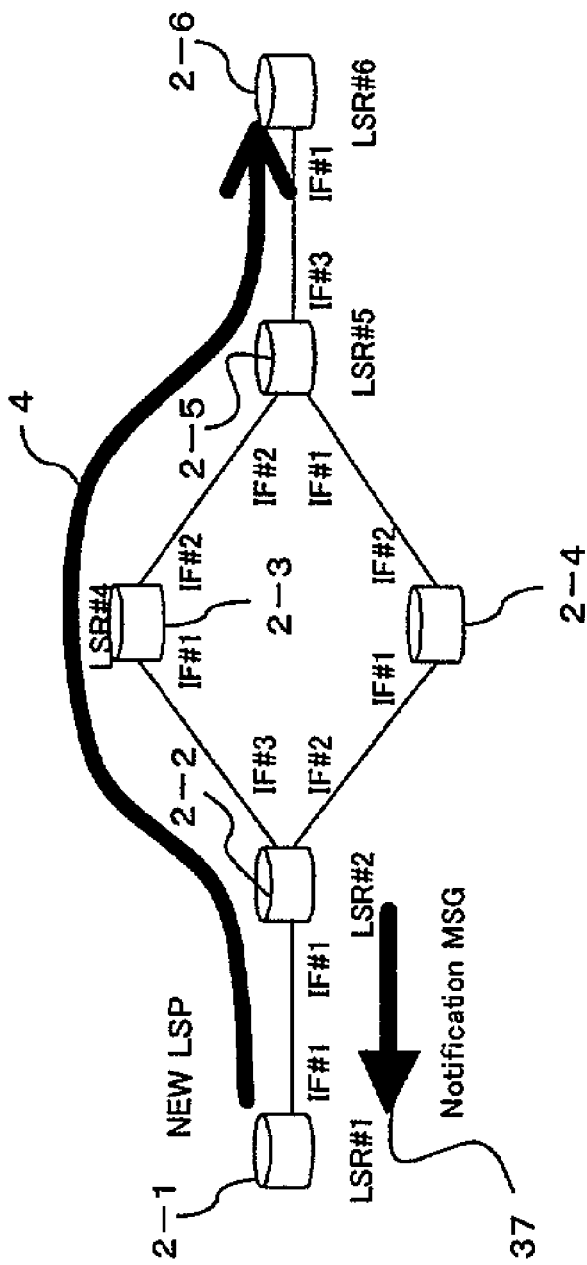

On the other hand, as FIG. 6A shows, by transmitting a notification message (Notification MSG) 37, the ingress node 2-2 notifies the ingress node 2-1 on the old path 3 that the path modification has been made in the middle of the LSP 3 after the transmission of the label release request 35. For example, as FIG. 6B shows, this notification message 37 accommodates the LSP-ID (=1) of the LSP 3 undergoing the path modification and the node addresses (LSR#2, LSR#4, LSR#5) of the nodes 2-2, 2-4 and 2-5 on the new path 4.

As described above, according to this embodiment, since the partial path modification is possible only between the en route nodes 2-2 and 2-5 on the a path-modified object LSP by interchanging the control messages (path modify request, label allocation request and label release request) for the path modification, as compared with the conventional technique, it is possible to shorten the time needed for the path modification for fast path modification, and further to reduce the number of control messages (packets) to be interchanged, thereby suppressing the increase in extra control traffic to nodes bearing no relation to the path modification.

In particular, in the above-described example, since the egress node 2-5 does not relay the label release request 36 to the downstream side, it is possible to further suppress the increase in the extra control traffic to the node 2-6 having no relation to the path modification.

In addition, since the old path remains effective (usable) even in the transition to the path switching owing to the aforesaid "label mergence" in the egress node 2-5, it is possible to not only reduce the packet loss stemming from the difference in distance or the like between the old path 3 and the new path 4 in the transition to the path switching, but also lessen the burden on the re-transmission control due to the packet loss in an upper layer, and even enhance the reliability of communications.

(A2) Modification of Path Modifying Procedure on One LSP

In the above-described example, although the "label mergence" is made in the egress node 2-5 for the prevention of the packet loss in the transition to the path switching, the path switching can also be conducted with no "label mergence".

That is, as mentioned above with reference to FIGS. 3A to 3D, upon receipt of a path modify request 32, the egress node 2-5 allocates an upstream side label (for example, C) for the new path 4 in relation to the old path 3 designated by the path modify request 32, and registers the association between the new upstream side label (=C), input IF [input IF (IF-ID=#2) which has received the path modify request 32] and the existing downstream side label (=d) for the old path 3, output IF (IF-ID=#3) in the label table 27-5 (see FIG. 7D) in an overwriting manner on the existing entry, thereby accomplishing the path switching on the egress node 2-5.

Following this, as well as the operations mentioned above with reference to FIGS. 4A to 4D, as FIGS. 7A to 7C show, a label allocation request 33 is transmitted from the node 2-5 to the node 2-4 while a label allocation request 34 is forwarded from the node 2-4 to the node 2-2; accordingly, as FIG. 7D shows, a label table 27-4 is newly made out in the node 2-4 and a label table 27-2 is updated in the node 2-2, thus implementing the path switching in the ingress node 2-2.

In addition, also in this case, for the release of the label resources on the old path 3, a label release request (Release REQ) is transmitted up to the egress node 2-5 along the old path 3, and the label of the old path 3 is released in each of the nodes 2-2, 2-4 and 2-5. In this case, since the egress node 2-5 does not make the label mergence (because the path switching has already been done), the upstream side label (=c) designated by a label release request 36 (see FIGS. 5A and 5C) received from the node 2-4 is released in a simple way.

The following operations (relay/stop of the label release request in the egress node 2-5, transmission of a notification message (Notification) 37 from the ingress node 2-2 to the ingress node 2-1, and others) are the same as those mentioned above.

(A3) Path Modification on a Plurality of LSPs

Secondly, a detailed description will be given hereinbelow of a procedure to be taken for the path modification is made on a plurality of LSPs in a batch way.

Figures 8B, 8C:
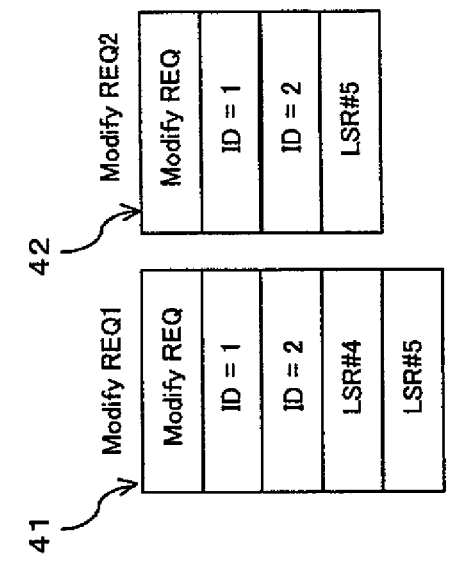
FIGS. 8A to 8C are illustrations each useful for explaining another example (more-than-one-path modify request) of a path modifying method for use in the MPLS network shown in FIG. 1.
Figure 8A:
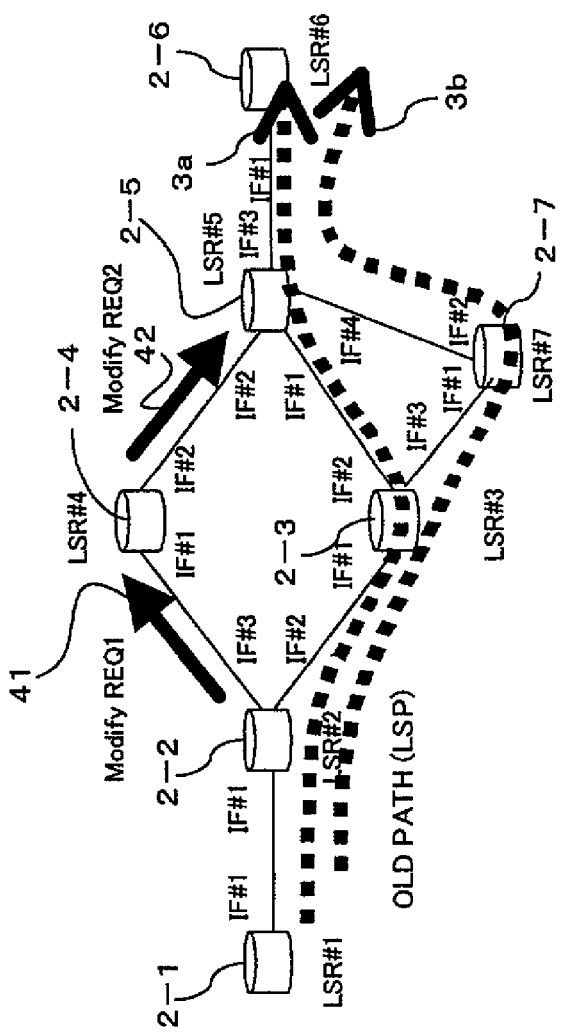

First of all, as FIG. 8A shows, let it be assumed that an LSP 3a (LSR#1→LSR#2→LSR#3→LSR#5→LSR#6) and an LSP 3b (LSR#1→LSR#2→LSR#3→LSR#7→LSR#5→LSR#6) have already been established through the setting of a CR-LDP or each of nodes 2-1, 2-2, 2-3, 2-4, 2-6 and 2-7. That is, for example, as FIG. 9D shows, let it be assumed that two entries about the LSP 3a (LSP-ID=1) and the LSP 3b (LSP-ID=2) have been registered in the label tables 27 of the nodes 2-1, 2-2, 2-3, 2-4, 2-6 and 2-7.

In this state, in a case in which the path modification on the LSPs 3a and 3b is made due to a variation of network situation such as the occurrence of trouble or the occurrence of congestion or circumstances on administration such as construction work [for example, in a case in which a transmission line between the node 2-2 and the node 2-3 cannot be put to use as shown in FIG. 10A, so the LSPs 3a and 3b are modified into LSPs (new paths) 4 passing through the node 2-4], a path modify request (Modify REQ) is transmitted to go from the ingress node 2-2 to the egress node 2-5 along each of the new paths 4.

That is, for example as FIG. 8B shows, in the ingress node 2-2, a path modify processing section 23 produces a path modify request (Modify REQ1) 41 accommodating identifies (LSP-ID=1, 2) of the plurality of LSPs 3a and 3b forming path-modified objects and node addresses (LSR#4, LSR#5) of the passing-through nodes 2-4 and 2-5 on the new path 4, and transmits it through a control packet transmitting section 28 and a packet transmitting section 30 to the next node 2-4 on the new path 4.

In other words, in this case, the path modify processing section 23 of the ingress node 2-2 functions as a more-than-one path modify request issuing section to issue the path modify request (more-than-one path modify request) 41 including the information on the plurality of old paths 3a and 3b.

Also in this case, in the node 2-4, when receiving the aforesaid path modify request 41, the path modify processing section 23 derives the pertaining-to node address (LSR#4) from the path modify request 41, and as a result, transmits, to the node 2-5 forming the next node on the new paths 4a and 4b, a path modify request (Modify REQ2) 42 (see FIG. 8C) accommodating a plurality of LSP-IDs of the path-modified objects and the node address (LSR#5) of the passing-through node 2-5 on the new paths 4a and 4b as shown in FIG. 8A.

When the egress node 2-5 receives this path modify request 42, a label allocation request (Label MAP) for the allocation of a label from this egress node 2-5 to the new paths 4a and 4b is transmitted to the ingress node 2-2 in the opposite direction along the path through which the path modify requests 41 and 42 have run.

That is, when the egress node 2-5 receives the aforesaid path modify request 42 through a packet receiving section 21 and a control packet receiving section 22, the path modify processing section 23 allocates a new upstream side labels for the plurality of LSPs 3a and 3b (for example, C for the LSP 3a and M for the LSP 3b), while a label registering/deleting section 26 registers the association (correspondence information) between the new upstream side labels (=C, M), input IF [input IF (IF-ID=#2) which has received the path modify request 32] and existing downstream side labels (=d, p) of the old paths 3a and 3b, output IF (IF-ID=#3) in a label table 27-5 (see FIG. 10F).

This means that the packet receiving section 21 and the control packet receiving section 22 in the egress node 2-5 function as a more-than-one modify request receiving section to receive the path modify request (more-than-one modify request) 42 including the information about the plurality of old paths 3a and 3b from the upstream side node 2-4 on the new paths 4a and 4b.

In addition, the path modify processing section 23 functions as a more-than-one new upstream label allocating section to allocate a plurality of new upstream side labels when the aforesaid more-than-one label allocation request receiving section receives the path modify request 42, while the path modify processing section 23 and the label registering/deleting section 26 functions as batch path modifying section to implement batch path modification from the plurality of old paths 3a and 3b into the new paths 4a and 4b by associating the new upstream side labels (C, M) allocated by the more-than-one new upstream allocating section with the plurality of existing downstream side labels (d, p), respectively.

With this operation, in the egress node 2-5, with respect to the plurality of LSPs 3a and 3b (LSP-ID=1, 2) forming path-modified objects, there are set the association between the input IF (IF-ID=#2), new upstream side label (C) and the output IF (IF-ID=#3), existing downstream side label (=d) and the association between the input IF (IF-ID=#2, new upstream side label (=M) and the output IF (IF–IF#3), existing downstream side label (=p).

Still additionally, as FIGS. 9A and 9C shows, in the egress node 2-5, the path modify processing section 23 produces a label allocation request (Label MAP1) accommodating the identifiers (LSP-ID=1, 2) of the plurality of LSPs 3a and 3b forming the path-modified objects and the labels (=C, M) corresponding thereto, and transmits it through the control packet transmitting section 28 and the packet transmitting section 30 to the upstream side node 2-4 on the new paths 4a and 4b.

That is, in this case, the path modify processing section 23 of the egress node 2-5 also functions as a more-than-one label allocation request issuing section to, when the path modify request 42 is received by the packet receiving section 30 and the control packet transmitting section 28 constituting the more-than-one path modify request receiving section as mentioned above, issues, to the upstream side in the new paths 4a and 4b, a label allocation request (more-than-one allocation request) 43 including the information about the plurality of old paths 3a and 3b.

Meanwhile, in the node 2-4 which has received the aforesaid label allocation request 43 through the packet receiving section 21 and the control packet receiving section 22, the path modify processing section 23 allocates the plurality of labels (=C, M), included in the received label allocation request 43, as downstream side labels, and newly allocates a plurality of upstream side labels (for example, B, N) corresponding thereto. Moreover, in accordance with an instruction from the path modify processing section 23 which has conducted this allocation, the label registering/deleting section 26 registers and associates these upstream side labels (=B, N) and the downstream side labels (=C, M) in the label table 27-4 (see FIG. 10F).

At this time, the input IF (IF-ID=#1) which has received the path modify request 41 is registered for each of the input IFs for the upstream side labels (=B, N), and the IF (IF- ID=#2) which has received the label allocation request 43 is registered for each of the output IFs for the downstream side labels (=C, M).

That is, in this case, in the node 2-4, a part comprising the packet receiving section 21 and the control packet receiving section 22 functions as a more-than-one label allocation request receiving section to receive the label allocation request (more-than-one label allocation request) 43 storing the information about the plurality of modified-into packet transfer paths (new paths) 4a and 4b.

In addition, the path modify processing section 23 functions as a more-than-one new label allocating section to, when the aforesaid label allocation request 43 is received by the packet receiving section 21 and the control packet receiving section 22 functioning as the more-than-one label allocation request receiving section as mentioned above, allocate new labels [new upstream side labels (B, N) and new downstream side labels (C, M)] to the upstream and downstream sides in the plurality of new paths 4a and 4b, while the path modify processing section 23 and the label registering/deleting section 26 function as a batch path establishing section to establish the plurality of new paths 4 in a batch manner by associating the new upstream side labels (B, N) with the new downstream side labels (C, M) on the plurality of new paths 4a and 4b.

Still additionally, as FIG. 10A shows, in the node 2-4, the path modify processing section 23 further issues a label allocation request (Label MAP2) 44 (see FIG. 10B) including identifiers (LSP-ID=1, 2) of the plurality of old paths 3a and 3b and the plurality of new upstream side labels (=B, N) newly allocated in the node 2-4 in relation to them, respectively, to the previous-stage node 2-2 on the new paths 4a and 4b.

When the ingress node 2-2 which has transmitted the first path modify request 41 receives this label allocation request 44 through the packet receiving section 21 and the control packet receiving section 22, in the egress node 2-2, the path modify processing section 23 allocates the plurality of labels (=B, N), stored in the label allocation request 44, as the downstream side labels on the new paths 4a and 4b.

That is, in this case, in the ingress node 2-2, the packet receiving section 21 and the control packet receiving section 22 functions as a more-than-one label allocation request receiving section to receive the label allocation request (more-than-one allocation request) 44 storing the information about the plurality of new paths 4a and 4b with respect to the path modify request 41 issued by the function of the aforesaid more-than-one path modify request issuing section, while the path modify processing section 23 functions as a more-than-one new downstream label allocating section to, when the more-than-one label allocation request receiving section receives the label allocation request 44, allocate a plurality of new downstream side labels.

Moreover, the path modify processing section 23 gives an instruction to the label registering/deleting section 26 for the registration of the plurality of new downstream side labels (=B, N) and, hence, the label registering/deleting section 26 registers the new downstream side labels (=B, N) in the label table 27-2 (see FIG. 9D) [updating the existing downstream labels (=b, m), already allocated with respect to the old paths 3a and 3b (existing upstream side labels=a, l), into the new downstream side labels (=B, N) in an overwriting manner].

In this connection, at this time, the output IF for the new downstream side labels (=B, N) is updated into the IF (IF-ID=#3) which has received the label allocation request 44. Therefore, the path switching operations from the plurality of LSPs 3a and 3b to the new paths 4a and 4b are collectively made in the ingress node 2-2.

That is, in this case, the path modify processing section 23 of the ingress node 2-2 also functions as a batch path modifying section to collectively implement the path modification from the plurality of old paths 3a and 3b into the new paths 4a and 4b by associating the new downstream side labels (B, N) allocated by the aforesaid more-than-one new downstream label allocating section with the plurality of existing upstream side labels (=a, l).

As stated above, in the case of this example, since the plurality of old paths 3a and 3b can collectively be modified into the new paths 4a and 4b at a high speed for one event such as the establishment of new paths, more resources can be released at a time to be used for the allocation to other new paths and the fast switching between the old paths 3a, 3b and the new paths 4a and 4b.

After such batch switching, the ingress node 2-2 transmits a label release request (Release REQ) to the egress node 2-5 through the each of the old paths 3a and 3b. That is, first, in the ingress node 2-2, the path modify processing section 23 releases the downstream side labels (=b, m) for the old paths 3a and 3b, and issues a label release request (Release REQ) 45 to the next node 2-3 on the old paths 3a and 3b as shown in FIG. 10A. This label release request 45 accommodates the plurality of LSP-ID (=1, 2) of the modified objects and the plurality of labels (=b, m) released (the upstream side labels to be released by the next node 2-3) as shown in FIG. 10B.

That is, in this case, the path modify processing section 23 functions as a more-than-one old path label information releasing section to, after implementing the aforesaid path modification on the plurality of old paths 3a and 3b, release the labels (=b, m) for the plurality of old paths 3a and 3b, and further functions as a more-than-one label release request issuing section to issue the label release request (more-than-one release request) 45 on the plurality of old paths 3a and 3b toward the egress node 2-5.

In addition, upon receipt of the label release request 45, the node 2-3 releases the plurality of upstream side labels (=b, m) designated by the label release request 45 and the downstream side labels (=c, n) of the plurality of old paths 3a and 3b. Still additionally, the node 2-3 issues each of label release requests (Release REQ 2, 3) 46 and 47 to each of the nodes 2-5 and 2-7 because the next node on the old path (LSP-ID=1) 3a is the node 2-5 while the next node on the old path (LSP-ID=2) 3b is the node 2-7, that is, the path falls into a branched condition. Incidentally, as a matter of course, the label release requests to the nodes 2-5 and 2-7 can also be issued individually from the upstream side node 2-2 at this node 2-3 existing at the branching point.

In this case, as FIG. 10C shows, the label release request (Release REQ2) 46 to the node 2-5 accommodates the identifier (LSP-ID=1) of the old path 3a forming the modified object and the downstream side label (=c) of the old path 3a released by the node 2-3 (the upstream label to be released by the next node 2-5). On the other hand, as FIG. 10D shows, the label release request (Release REQ3) 47 to the node 2-7 stores the identifier (LSP-ID=2) of the old path 3b forming the modified object and the downstream side label (=n) of the old path 3b released by the node 2-3 (the upstream side label to be released by the next node 2-7).

Furthermore, upon receipt of this label release request 47, the node 2-7 deletes the entry on the old path 3b (LSP-ID=2) designated by the label release request 47 from the label table 27-7 (see FIG. 9D) and releases the label (=n) designated by the same label release request 47 and further releases a downstream side label (=o) corresponding to that label (=n)

Thereafter, as FIGS. 10A and 1E show, the node 2-7 issues, to the next node (egress node) 2-5 on the old path 3b, a label release request (Release REQ4) 48 including the identifier (LSP-ID=2) of the old path 3b and the downstream side label (=o) for the old path 3b released by this node 2-7 (the upstream side label to be released by the next node 2-5).

In addition, upon receipt of the label release request 46 from the node 2-3, the egress node 2-5 releases the upstream side label (=c) for the one old path 3a (LSP-ID=1) designated in the label release request 46, and upon receipt of the label release request 48 from the node 2-7, releases the upstream side label (=c) for the other old path 3b (LSP-ID=2).

Also in this case, the egress node 2-5 recognizes that it is the egress node, by storing the information representative of the node which has transmitted the first label allocation request 43, in the memory 231 of the path modify processing section 23, and terminates the label release requests 46 and 48 to cease the relay toward the downstream side (node 2-6).

Still additionally, after transmitting the label release request 45 to the node 2-3, the ingress node 2-2 can notify that the path modification has been made in the middle of each of the old paths 3a and 3b, by transmitting a notification message (Notification MSG) to the ingress node 2-1 on the old path 3. In this case, the notification message can hold only the plurality of old path LSP-IDs (=1, 2) undergoing the path modification and the node addresses (LSR#2, LSR#4, LSR#5) of the nodes 2-2, 2-4 and 2-5 on the new path 4.

Also in the above-mentioned case, the egress node 2-5 maintains the label tables 27-5 for the old paths 3a and 3b without deleting them, that is, maintains the label mergence, until it receives the label release requests 46 and 48, it is possible to prevent the packet loss in the transition to the path switching on each of the old paths 3a and 3b, thus enabling the path switching causing no disconnection.

(A4) Notification of Path Modification

Since each of the foregoing path modify requests 31, 32, 41, 42 or each of the label allocation requests 33, 34, 43, 44 has no information representative of the route the LSP takes, the nodes 2-i on this LSP cannot seize which of the nodes 2-i the LSP passes through.

This means that each of the nodes 2-i can seize the other nodes 2-i the relevant LSP goes through, by putting information (node address) on the passing-through nodes 2-i in one of or all of the path modify requests 31, 32, 41, 42 and label allocation requests 33, 34, 43, 44, or by inhibiting the deletion of its own node address at relaying the path modify requests 31, 32, 41 and 42.

In such a case, when a partial path has been modified as mentioned above, sometimes there is a need to notify path modify information to the nodes 2-i which have had no relation to the path modification. In this case, as mentioned above with reference to FIGS. 6A and 6B, it is achievable in a simple manner that the ingress node 2-2 notifies the path modify information to the ingress node 2-1 through the use of a notification message 37 and, in like manner, the egress node 2-5 issues a notification message 37 to the egress node 2-6, for example, after the transmission of the label allocation requests 33, 34, 43 and 434 or the reception of the label release requests 36, 46 and 48.

In addition, for example, in a case in which one or more other nodes lie between the ingress node 2-1 and the ingress node 2-2, the nodes existing on the upstream side of the ingress node 2-2 and bearing no relation to the path modification can also seize the LSP after the path modification in a manner that the ingress node 2-2 transmits a notification message 37 to the upstream side along the LSP so that the node which has received this notification message 37 acquires (copies) the message contents.

In like manner, in a case in which one or more other nodes lie between the egress node 2-6 and the egress node 2-5, the nodes existing on the downstream side of the egress node 2-5 and bearing no relation to the path modification can also seize the LSP after the path modification in a manner that the egress node 2-5 transmits a notification message 37 to the downstream side along the LSP so that the node which has received this notification message 37 acquires (copies) the message contents.

Incidentally, although the above-described examples relate to the path modification to be made for when communication (received) data is electrically switched as packet data by means of a label, for example in a case in which communication data is transferred as an optical signal as will be mentioned later, if the information on the wavelength of that optical signal is used as the MPLS label, the path modification similar to that mentioned above becomes feasible at an optical level, which offers the effects similar to those stated above. One example thereof will be described hereinbelow.

(B) Application to Hybrid Network (Virtual Router Network)

In the recent years, with an explosive increase in traffic on the internet, it has been of urgent necessity to achieve a large network capacity. Currently, a point-to-point WDM (Wavelength Division Multiplex) transmission has been employed for speed-up on a transmission path.

However, the electrical processing in an electric switch (packet switch) (label switching node) forming a termination point of the WDM transmission is a bottleneck. For eliminating this problem to increase the transmission capacity up to a large value, in the recent years, an attempt is being made to employ an optical switch (optical switching node) for routing (switching) communication data at an optical level.

This optical switch can more easily realize the increase in transmission capacity as compared with the electric switch, and this feature provides an effective switch for the construction of a backbone of a next-generation IP network. However, if the backbone is constructed with only optical switches, then there is a need to use optical paths proportional to the square of the number of edge routers for securing the connectivity among the edge routers, and the scalability creates a problem. On the other hand, the electric switch shows, for example, an advantage of effectively utilize the network resources through the packet multiplex allowing flexible network construction.

For this reason, in the recent years, a hybrid network (virtual router network) has been desired which makes the use of the advantages of these optical switch and packet switch. That is, a need for a combination of the optical switch and the packet switch exists, thus constructing a network which can cope with the large-capacity transmission while securing the connectivity among the edge routers.

In such a hybrid network, for example, a packet switch is put between edge routers for a small traffic quantity while the transmission is made through the use of an optical path in a state where aggregation is made to other LSPs, thus securing much connectivity with a small number of optical paths, and for a large traffic quantity, an optical path is directly established between edge routers, thereby achieving a large capacity.

For the ability of such a hybrid network to reach the maximum, there is a need to point out specifically the traffic to be made by the shortcut on a packet switch using an optical switch and the traffic which is to be aggregated with a packet switch and further to dynamically make the interchange therebetween. That is, there is a need to implement the control for establishing/removing a path (optical path) of an optical layer properly according to dynamic traffic variation or the like for modifying the packet layer path (LSP) thereon.

(B1) Necessity of L1/L2 Cooperation Control

Figure 14:
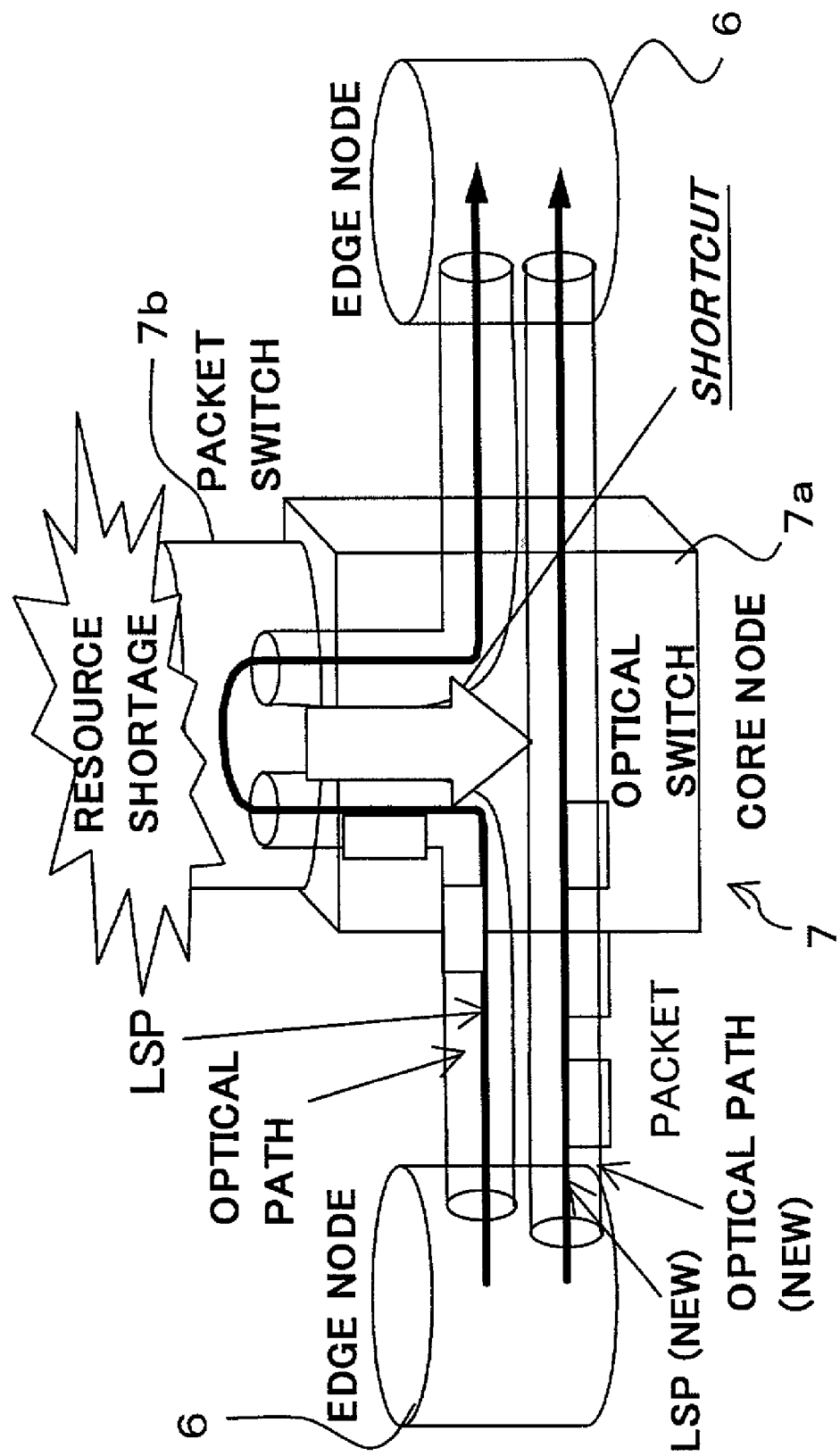
FIG. 14 is an illustration useful for explaining L1/L2 cooperation control for use in the hybrid network shown in FIG. 11.

An L1 path (optical path) based on optical switches is a fast communication path such as 1/10 GbE, OC (Optical Carrier)-48/192, while some L2 paths (LSP: Label Switched Path) carrying a data flow have as a small bandwidth as several Mbps to several hundreds Mbps. Accordingly, there is a need to multiplex a plurality of LSPs through the use of packet switches for achieving the efficient use of network resources. However, many LSP establishment requests occur, and the actual establishment thereof leads to the insufficiency of the packet switch resources. This requires avoiding the resource insufficiency by modifying the LSPs (bypassing packet switches) (see FIG. 14).

Figure 11:
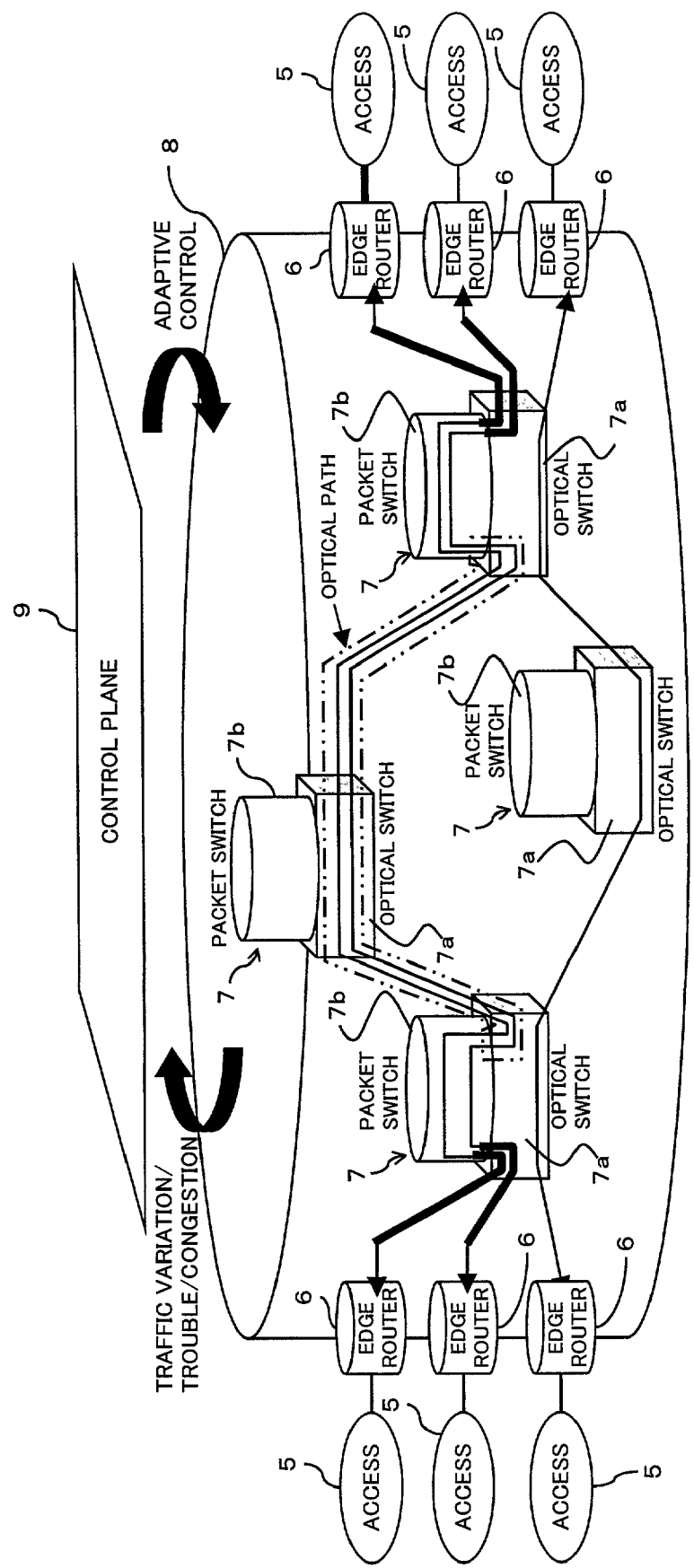
FIG. 11 is a block diagram showing one example of a hybrid network according to an embodiment of the present invention.

FIG. 11 shows illustratively one example of a hybrid network to be used for implementing such control. In FIG. 11, reference numerals 5 represent an access network, numerals designate an edge router, and numerals 7 denote a combined switch comprising an optical switch 7a and a packet switch 7b. These combined switches 7 constitute a backbone (hybrid network) 8 for the access networks 5. Switches other than the combined switches 7 are also acceptable to the edge routers 6.

In addition, a control plane depicted at numeral 9 has a function to operate optical paths or LSPs adaptively on the basis of a status (network topology information or the like) of the hybrid network 8 or a request (new LSP addition request, band increase request on a specified existing LSP, or the like) from an operator/user for dynamically interchanging a traffic passing through the packet switch 7b and a traffic to be made by the shortcut (replacement) on the packet switch 7b using the optical switch 7a.

In this case, for setting packet layer and optical layer paths, for example, the control plane 9 uses GMPLS (Generalized MPLS) signaling (reference documents: MPLS Working Group Internet Draft Generalized MPLS-signaling Function Description (draft-ietf-mpls generalized-signaling-07.txt Peter Ashwood-Smith (Nortel Networks Corp.) and so on., November 2001).

As a trigger for such adaptive control, it is considered that there are the detection of variation in traffic quantity depending on the measurement of the traffic quantity, the detection of occurrence of congestion, the detection of trouble or a specific band request from a user. In the following description, a specific request from a user will be taken as a trigger.

(B2) Arrangement of Control Functions

With respect to the functions of the control plane 9, there are two types: a model in which the functions are placed in a server (route server), acting as an administrative node, in a state centralized and a model in which they are placed in nodes (combined switches) 7 on the network 8 in a state decentralized. A description will be given hereinbelow of these two types.

Figure 12:
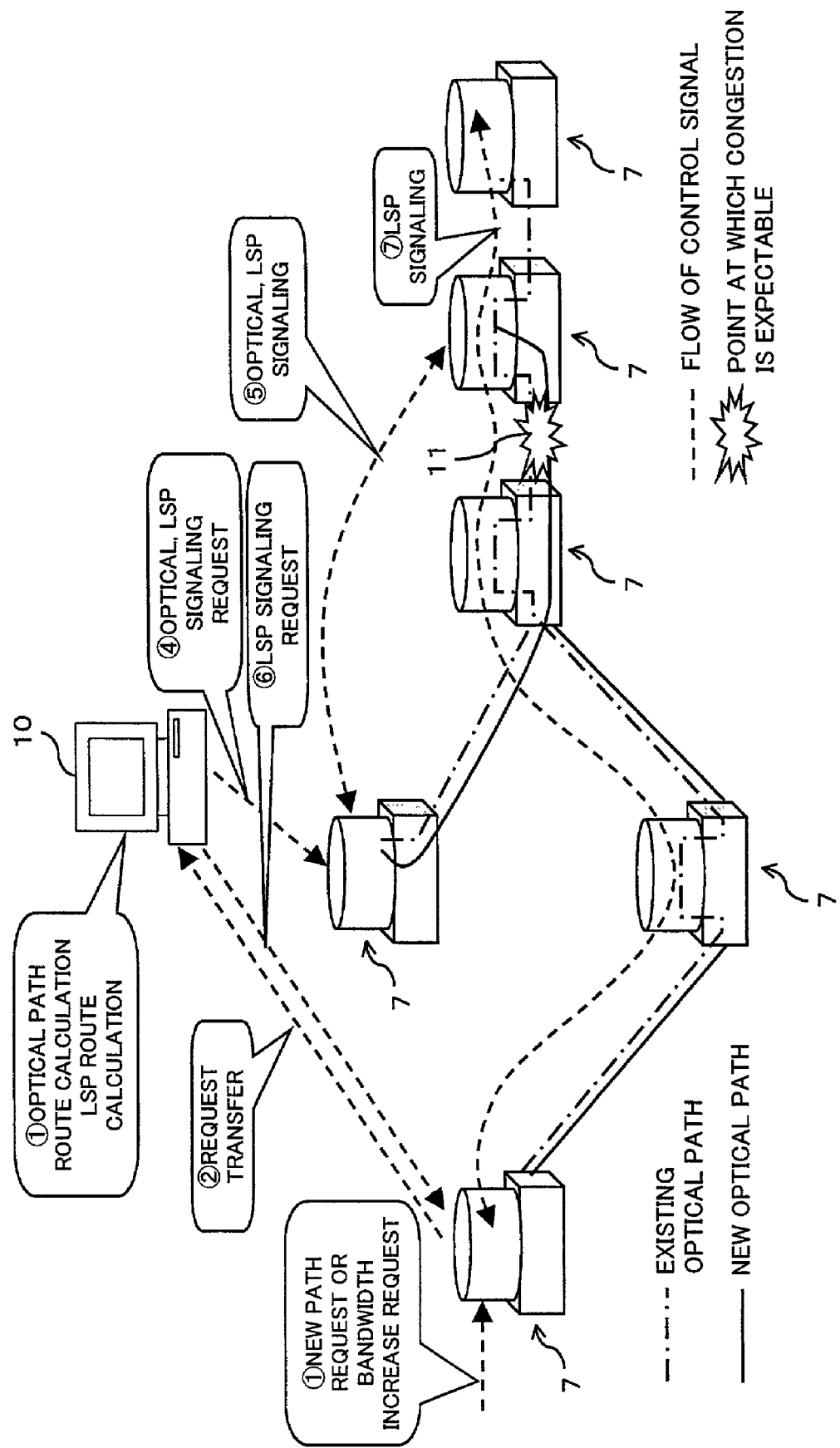
FIG. 12 is an illustration useful for explaining a model of centralized arrangement of control functions for use in the hybrid network shown in FIG. 11.

(1) Model in Which Control Functions are placed in Route Server in a State Centralized (see FIG. 12)

A description will be given hereinbelow of an operation of the model shown in FIG. 12. When one node 7 (or one edge router 6) receives a request for a new LSP (new path request) or a request for a band increase for an existing LSP from a user (see circled numeral 1 in FIG. 12), it sends this request to a route server 10 (see circled numeral 2; request transferring step). The route server 10 makes a decision on whether or not an LSP corresponding to this request can be accommodated on a existing optical path.

That is, upon receipt of the aforesaid request, the route server 10 calculates and obtains a new LSP (new path) to be established on the basis of network topology information, and confirms whether or not a link (optical path) resource (in this case, band) on the obtained new path is in an insufficient condition (new path confirming step).

If the result shows that the band of the existing optical path is in an insufficient condition so that it is impossible to accommodate the new LSP on the existing optical path, a portion of the LSP passing through the existing optical path insufficient in band is shortcut with an optical path for accommodating the band on the request. Thus, the route server 10 first determines the LSP to be shortcut with an optical path (see circled numeral 3) and calculates a route of the optical path for the shortcut.

That is, if the link band is in shortage, the route server 10 obtains a new (or existing) optical path forming a modified-into path from an existing (previously established) LSP passing through the link (modified-into path specifying step). Moreover, if there is a need to newly establish an optical path for shortcut (that is, the other existing optical paths cannot also accommodate the new LSP), then the route server 10 gives an instruction to a ingress node on the new optical path to be established, for activating, for example, "GMPLS" signaling (optical path establishment signaling; which will be mentioned in detail later) (new optical path establishment signaling step).

Thus, each of the ingress node, relaying node and egress node on the new optical path handles the aforesaid optical path establishment signaling to establish a new optical path for shortcut (which will be referred to hereinafter as "shortcut optical path").

Following this, for shifting (path-modifying) a portion of the existing LSP, passing through the link which is insufficient in band, to the shortcut optical path established as mentioned above, the route sever 10 notifies (gives a trigger; see circled numeral 4) the path modification ingress node of a request for transmitting path modification signaling in the above-described embodiment (path modify request).

Through this operation, the node on the new path of the existing LSP processes the path modify signaling (path modify request, label allocation request) to perform the path modification into the shortcut optical path of the existing LSP. On the other hand, the node on the old path of the existing LSP handles the path modify signaling (label release request) to cut off the existing LSP (see circled numeral 5; path modifying step).

Thereafter, the route server 10 gives an instruction to a ingress node on the new LSP to be established in accordance with a request from a user for activating LSP establishment signaling (new path establishment signaling) (new path establishment signaling step). This makes each of the ingress node, relaying node and egress node on the new LSP handle the LSP establishment signaling to set the requested new LSP (see circled numerals 6 and 7; new path establishing step). A more detailed description will be given later of a method of shifting the existing LSP.

In this way, in adding a new LSP, a portion of an existing LSP on a link between specified nodes is shifted to a shortcut optical path to produce extra resources on this link so that a new LSP is established thereon.

The advantages of this model are that, because the topology and resource information are managed in the route server 10 in a state centralized, there is no need to synchronize a plurality of databases, and that the control is always implemented on the basis of the latest topology/resource information. Conversely, this model creates a problem in that all the requests enter one server 10, which causes a bottleneck. That is, this model works well when the request occurrence frequency is low, but, if the request occurrence frequency is high, it requires the functional enlargement of the server 10 or the additional operations such as dividing the network 8 into subnetworks or selecting a decentralized model.

Figure 13:
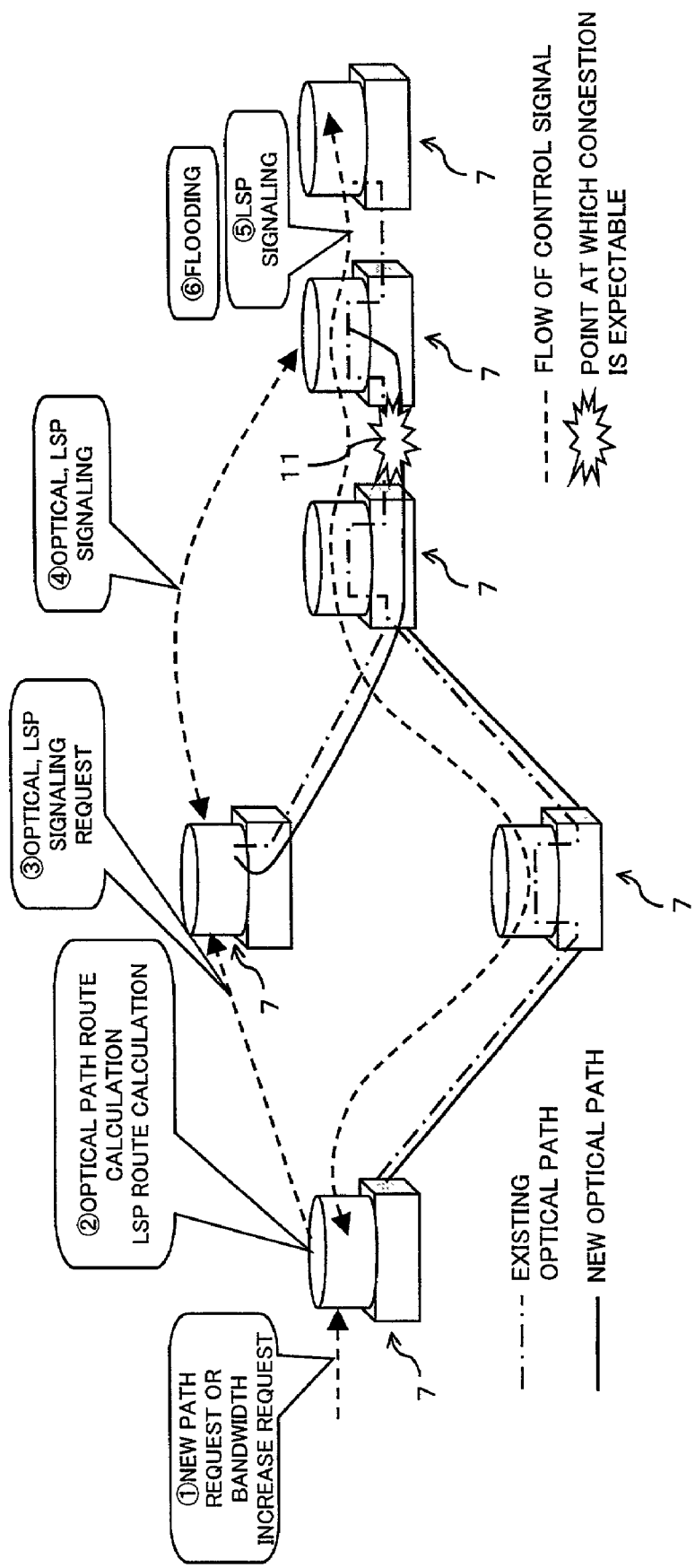
FIG. 13 is an illustration useful for explaining a model of decentralized arrangement of control functions for use in the hybrid network shown in FIG. 11.

(2) Model in Which Control Functions are placed in a State Decentralized (see FIG. 13)

In a model shown in FIG. 13, a node 7 (or an edge router 6) receiving a new LSP request or a band increase request is made to fulfill the foregoing function (optical path route calculation, LSP route calculation, and others). That is, the node receiving a new LSP addition request or a band increase request on an existing LSP calculates and obtains a new LSP (new path) to be established on the basis of topology information or the like and confirms whether or not the link resource on this new path is in shortage (new path confirming step).

The other operations following this are generally similar to those of the above-described centralized arrangement type mode. However, in this case, since the databases for the topology and the resources are decentralized, flooding processing becomes necessary for synchronizing them in the entire network 8.

An advantage of this model is, even in the case of a high request frequency, less response degradation because of the decentralization of the route calculation. On the other hand, this model creates a problem in that the synchronization of the topology/resource information due to the flooding processing requires a large amount of communication quantity (traffic) and the occurrence of delay of the synchronization of the topology/resource information sometimes causes improper control.

Such unnecessary control lowers the utilization efficiency of the network 8 and decreases the probability of the request accommodation, and further produces a factor to the degradation of the traffic quality stemming from an increase in number of times of shifting of the traffic accommodated. For lessening these effects thereof, it is considered to employ a mechanism to speed up the topology synchronization by developing close relation on the topology of the network 8 forming the controlled object and enlarging the band and to inhibit (lockout) the occurrence of different control in the peripheral node 7 (or 6) where the control takes place.

From the above discussion, the arrangement and problems of the control functions according to trigger occurrence frequency are as follows.

TABLE 1

| Trigger Occurrene Frequency | Arrangement of Control Functions | Advantages | Problems |
|---|---|---|---|
| Low to Middle | Centralized | No Need for Flooding Control Based on Latest Topology | Need for Division into Subnets as Needed |

TABLE 1-continued

| Trigger Occurrene Frequency | Arrangement of Control Functions | Advantages | Problems |
|---|---|---|---|
| High | Decentralized | Fast Response Due to Decentralization of Route Calculation | Speed-up of Topology Synchronization Employment of lockout mechanism |

In this connection, in both the centralized arrangement model and decentralized arrangement model, in a case in which there is no need to newly establish a shortcut optical path, that is, if it is accommodatable with another existing optical path, the aforesaid signaling (new optical path establishing signaling) procedure of establishing a new optical path becomes unnecessary, which results in requiring only the procedure from the path modification of an existing LSP to that existing optical path. In addition, both the models are applicable to the basic embodiment described above.

For example, when, in the MPLS network shown in FIG. 1, a route server 10 serving as an administrative node is provided to determine the aforesaid old path 3 and new path 4 on the basis of the existing LSP information (existing packet transfer path information) on the MPLS network 1 and the topology information on the MPLS network 1, the path modify processing section 23 (path modify request transmitting section) of the ingress node 2-2 receives, as a trigger, at least the information on the new path 4 determined in the route server 10, and transmits the aforesaid partial path modify request 31.

That is, in this case, to say the least of it, the route server 10 not only functions as a determining section to determine the old path 3 and the new path 4 on the basis of the existing LSP information and network topology information on the MPLS network 1, but also functions as a path notifying section to notify, to the ingress node 2-2 lying at the upstream side end of a partial section of the old path 3 determined by this determining section, at least the information on the new path 4 determined by the determining section, as a trigger which makes the ingress node 2-2 transmit a path modify request for the partial path modification from the old path 3 to the new path 4.

On the other hand, in a case in which the function of the aforesaid route server 10 is put in each of the nodes 2-i in the MPLS network 1, the node 2-i which has received a new LSP addition request or a band increase request, functions as the aforesaid route server 10 and gives the aforesaid trigger to the ingress node 2-2.

In either case, it is possible to provide the advantages of each of the models shown in the foregoing Table 1, and further to offer the effects similar to those of the basic embodiment. Even if any one of the models is put to use, the ingress node 2-2 (path modify processing section 23) can include a function of a path modify completion notifying section to notify the completion of the aforesaid partial path modification to the route server 10, for example, at the issue of the aforesaid modification message 37 (see FIGS. 6A and 6B) or the like. This allows the route server 10 to seize whether or not the path modification has normally reached the completion.

(B3) L1/L2 Cooperation Control

A more detailed description will be given hereinbelow of the control (L1/L2 cooperation control) whereby the above-mentioned centralized arrangement model is put to utilization, the route server 10 monitors the LSPs, packet switches 7b and others and establishes an optical path for the shortcut of the packet switch 7b which is in an insufficient resource condition for bypassing the LSP with the optical path.

(1) GMPLS (Generalized MPLS)

In the IETF (Internet Engineering Task Force), it has been studied to apply the MPLS to an optical network by associating a label on the MPLS (Multi Protocol Label Switching) with an optical wavelength as stated above (see the aforesaid reference document). That is, in a case in which communication data is transferred in the form of an optical signal, the wavelength information on that optical signal is used as a label. The establishment of an optical path based upon the "GMPLS" is made as follows.

First, a ingress node on an optical path transmits a label request (Label REQ) stored in a node address of a passing-through optical switch along an optical path to be established, and the relaying switches on the optical path relay the received label request (Label REQ) to an egress node while allocating a downstream side label (wavelength).

Upon receipt of the label request, the egress node returns a label allocation request (Label MAP) in the opposite direction along that path. The relaying optical devices relay the label allocation request up to the ingress node while allocating an upstream side label (wavelength). Lastly, when the label allocation request reaches the ingress node, a label table is made out in each of the optical switches existing on the optical path, thus establishing the optical path.

(2) Path Modify LDP (Label Distribution Protocol)

In a case in which an LSP is accommodated in the optical path established as mentioned above, it is possible to use the path modifying method described above with reference to FIGS. 1 to 10. That is, it is possible to conduct the processing (path modify LDP) such as (a) interchanging control messages through the use of only a portion of the path undergoing the path modification, (b) achieving the path modification on a plurality of LSPs with one control message, and (c) performing the label mergence in the transition to the path modification processing in a downstream node (egress node) concerned with the path switching.

Figure 15:
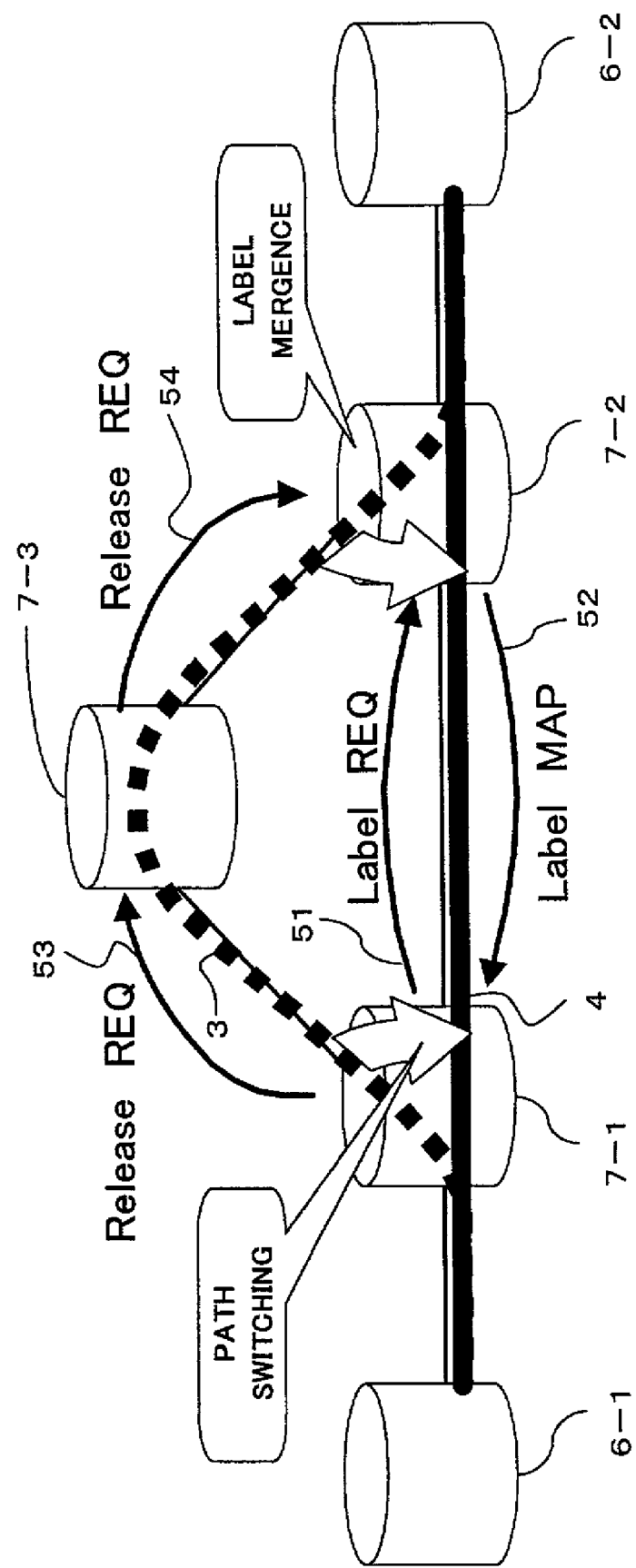
FIG. 15 is an illustration useful for explaining path modification into an optical path for use in the hybrid network shown in FIG. 11.

That is, for example, as FIG. 15 shows, the upstream side node (ingress node) 7-1 concerned with the switching transmits a label request (label REQ; path modify request) 51 including a list on the new path 4 and the LSP 3 forming the path-modified object along the new path 4. In FIG. 15, reference numerals 6-1 and 6-2 represent an edge router while numerals 7-1 to 7-3 designate a combined switch.

Moreover, upon reception of the aforesaid path modify request 51, the downstream side node (egress node) 7-2 concerned with the switching allocates a new label (wavelength) for a plurality of LSPs put in the received path modify request 51, and returns a label allocation request (label MAP) 52 in the opposite direction along the new path 4. At this time, the egress node 7-2 performs the label mergence between the new label (wavelength) and the old label (wavelength) already allocated.

A relaying node (not shown in FIG. 15), when receiving the aforesaid label allocation request 52, allocates a new label (wavelength) for the plurality of LSPs, and relays the label allocation request 52 up to the ingress node 7-1. When receiving this label allocation request 52, the ingress node 7-2 allocates a new label (wavelength) and transmits label release requests (Release REQ) 53 and 54 along the old path 3 after the switching from the old path 3 to the new path 4.

Following this, lastly, the egress node 7-2 receives the label release request 54 and releases the label (wavelength) for the old path 3 to cancel the label mergence, so the path modify reaches completion.

Figure 16:
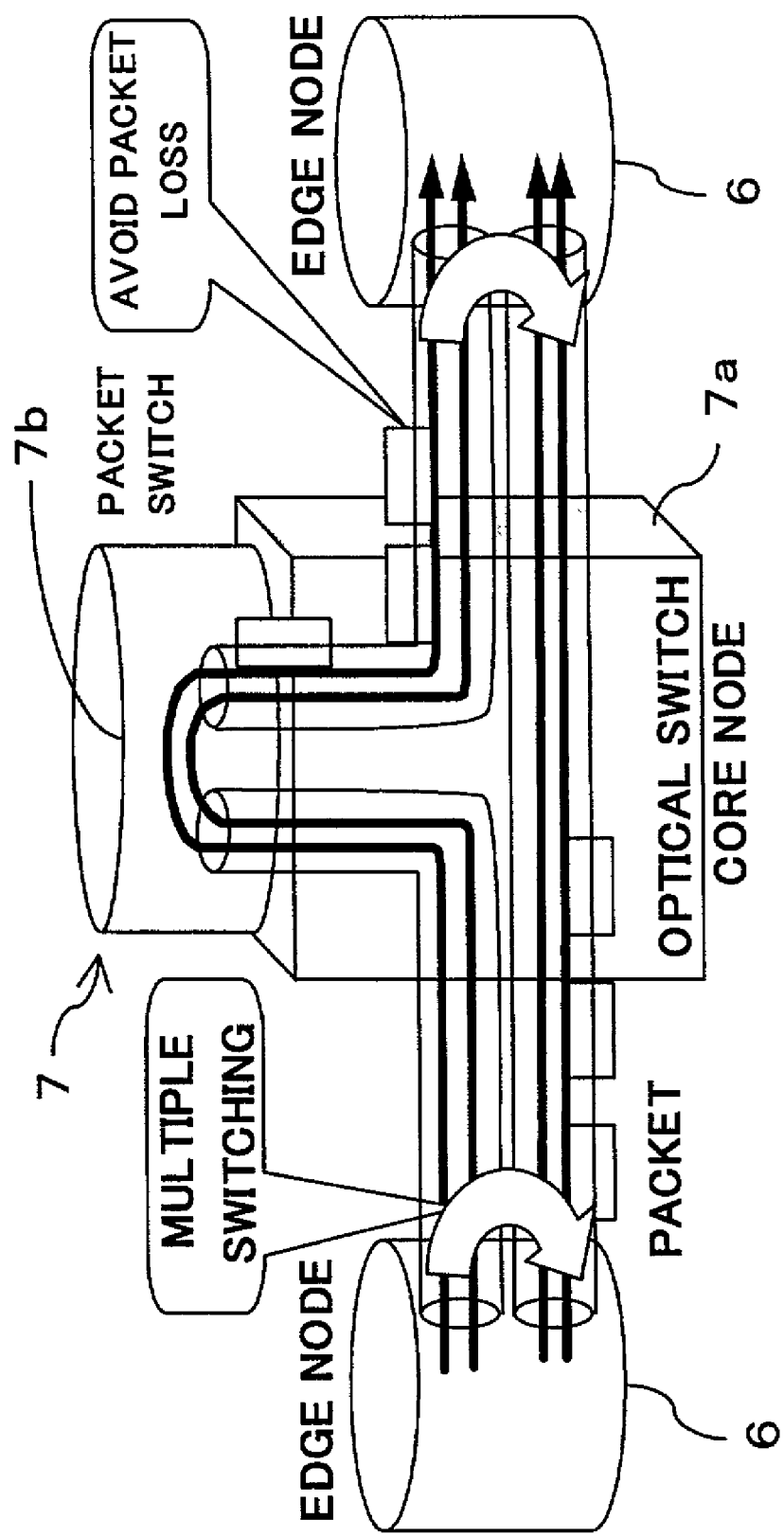
FIG. 16 is an illustration useful f or explaining L1/L2 cooperation control for use in the hybrid network shown in FIG. 11.

By implementing the path modification, even in the hybrid network 8, the batch path modification of a plurality of LSPs between the L1 (optical path) and the L2 (LSP) and the prevention of the packet loss in the transition to the path modification become feasible as well as the path modifying method described above with reference to FIGS. 1 to 10 (see FIG. 16).

Accordingly, in terms of one event such as the new establishment of an optical path, it is possible not only to properly select a plurality of LSPs for accomplishing the path modification into that optical path in a batch manner and at a high speed and for releasing more resources in the packet switch 7b at a time, but also to accomplish the fast switching between an old path and a new path, and even to avoid the occurrence of packet loss stemming from a difference in distance between the old path and the new path, or the like.

(3) Example of Operation in L1/L2 Cooperation Control

Furthermore, a description will be given hereinbelow of an operation for the L1/L2 cooperation control in a case in which, for example, the aforesaid route server 10 receives an LSP establishment request and detects the resource shortage in one packet switch 7b (see FIG. 17).

Figure 17:
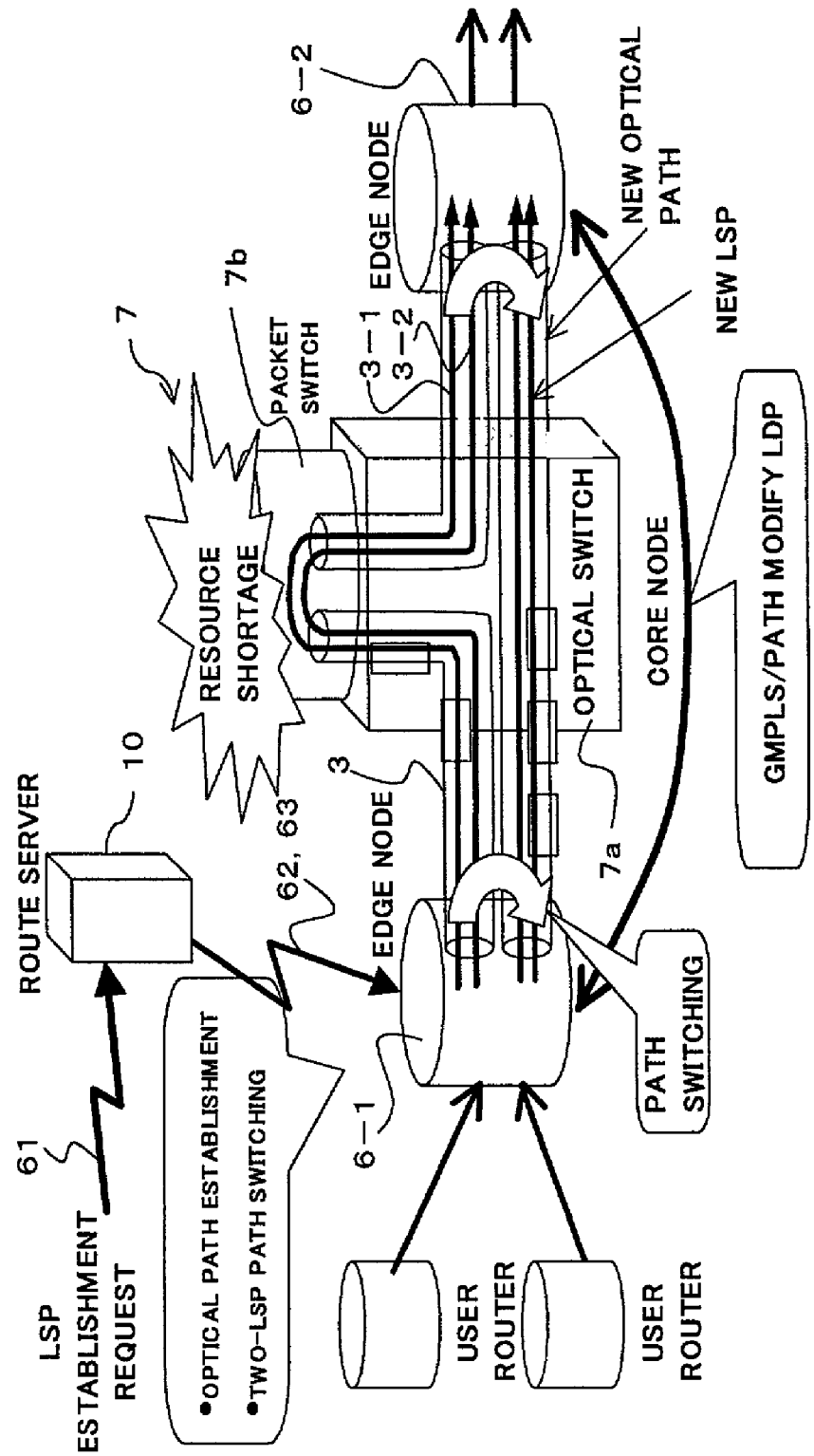
FIG. 17 is an illustration useful for explaining a concrete example of L1/L2 cooperation control for use in the hybrid network shown in FIG. 11.
Figure 18:
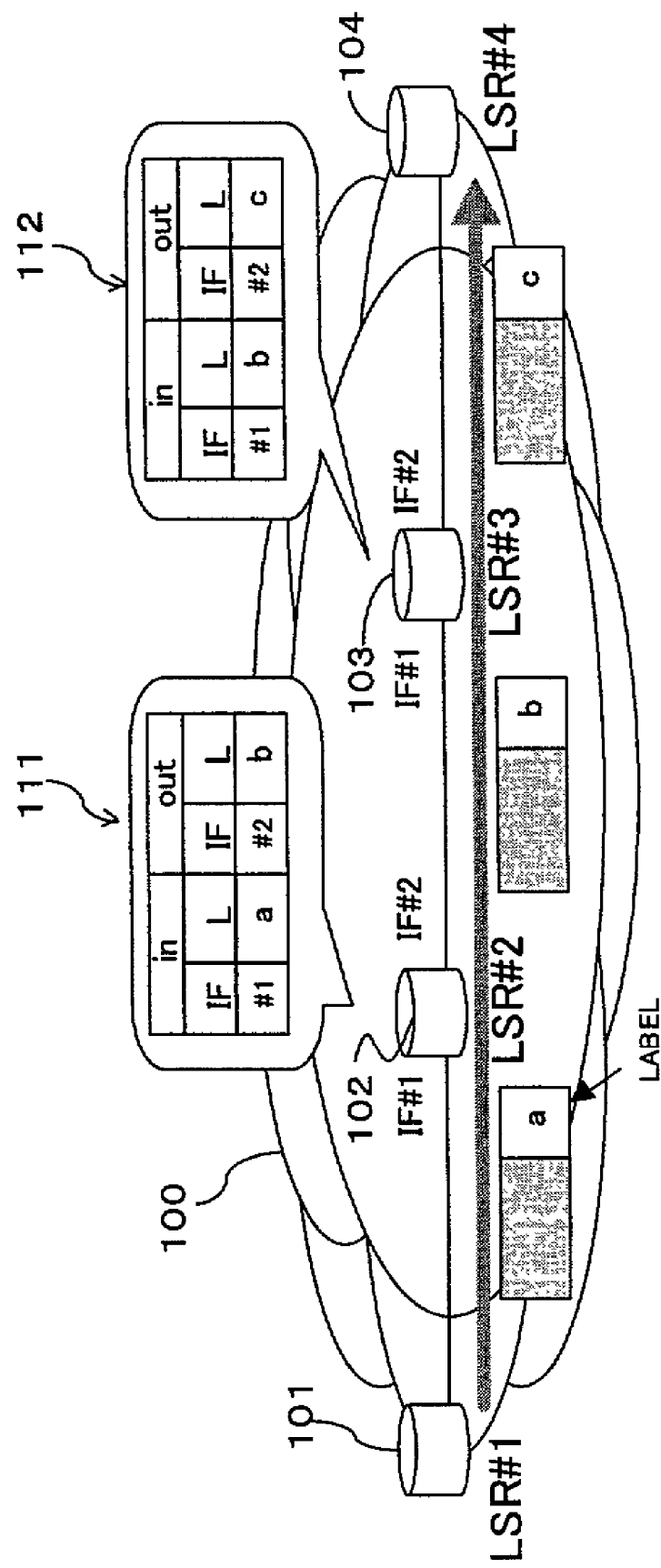
FIG. 18 is an illustration for explaining a conventional packet transfer method for use in an MPLS network.
Figure 19:
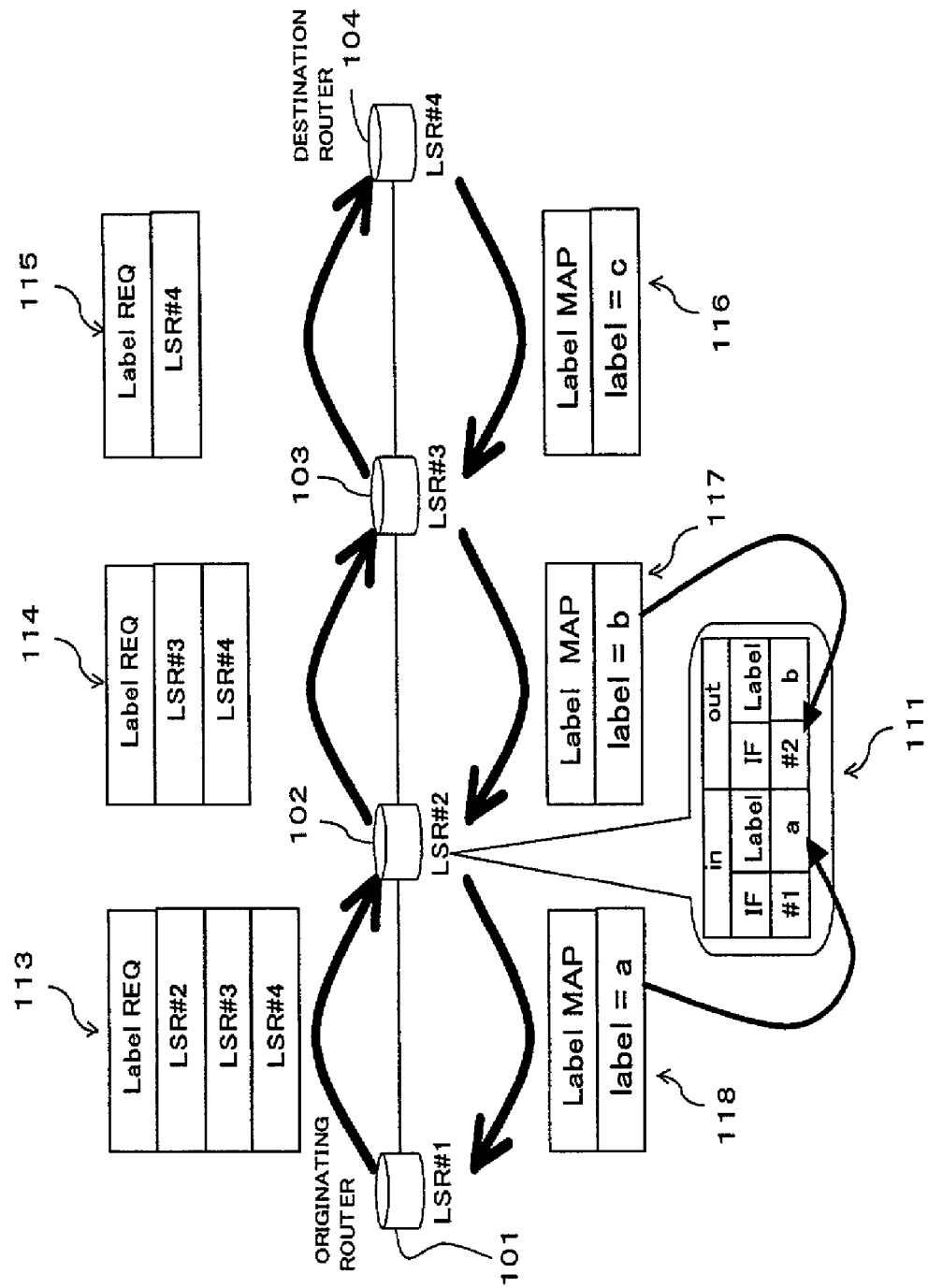
FIG. 19 is an illustration for explaining a conventional label distribution protocol (CR-LDP) for use in an MPLS network.

First, as FIG. 17 shows, when receiving an LSP establishment request 61, the route server 10 retrieves an LSP forming an established object. When detecting the resource shortage of a packet switch on the path obtained through this retrieval, the route server 10 calculates an optical path for the shortcut of this packet switch 7b.

In addition, the route server 10 transmits a GMPLS activation request 62 for the establishment of a new optical path (new path) 4 to a ingress node 6-1 on the shortcut optical path. The ingress node 6-1 establishes the new path 4 up to an egress node 6-2 on the optical path 4 to be established through the use of the aforesaid "GMPLS". Subsequently, the route server 10 transmits a path modify LDP activation request 63 to the ingress node 6-1 for the path modification for LSPs (for example, in FIG. 17, two LSPs 3-1 and 3-2) to be accommodated in the new optical path 4 established.

With respect to the egress node 6-2, the ingress node 6-1 interchanges a label request (Label REQ) and a label allocation request (label MAP) on the new path 4 and interchanges a label release request (Release REQ) on the old path 3, thereby accomplishing the path modification of the LSPs 3-1 and 3-2 into the new path 4. Thus, the resources of the packet switch 7b are released to permit the additional installation of a new LSP. That is, an LSP passing through the packet switch 7b undergoing the release of the resources can be established through the use of the aforesaid CR-LDP.

As described above, in the L1/L2 cooperation control according to this embodiment, it is possible to achieve the batch path modification on a plurality of LSPs, and realize avoiding the occurrence of packet loss at the path modification, and further to execute the path control on optical paths and LSPs in accordance with the network situation. Accordingly, it is possible to properly use the packet multiplexing enabling the effective utilization of network resources and the optical transmission enabling the large-capacity transfer, thus leading to the efficient use of the hybrid network 8.

(C) Others

Although the above description of the embodiment relates to the nodes for conducting the packet transfer by handling labels or optical wavelengths acting as labels, for example, it is also possible to, in a TDM node such as a TDM (Time Division Multiplex) exchange which performs the packet transfer according to a time slot, realize the path modification in the middle of a path as well as the above-described embodiment by handling a time slot as a label.

That is, in a case in which communication data is transferred in a state stored in a predetermined time slot, if the information on the time slot is used as an MPLS label, the effects similar to those of the above-described basic embodiment are attainable.

In addition, there has been known a space switch which performs the data interchange through the use of only input/output ports, and also in this case, the same processing (path modification in the middle of a path) can be done by ignoring the label in the above-described basic embodiment.

It should be understood that the present invention is not limited to the above-described embodiments, and that it is intended to cover all changes and modifications of the embodiments of the invention herein which do not constitute departures from the spirit and scope of the invention.

What is claimed is:

1. A path modifying method for use in a label transfer network including a plurality of label switching nodes for transferring received data in accordance with label information of said received data, said method comprising:
    transmitting a path modifying request from an ingress label switching node positioned at an upstream side end of a partial section of a work path which is intended for path modification to an egress label switching node positioned at a downstream end of the partial section via a detour path between said ingress label switching node and said egress label switching node;
    executing a partial path modification from said work path (hereinafter referred as a "old path") of the partial section to said detour path so as to use said detour path as a new data transfer path (hereinafter referred as a "new path") between said ingress label switching node and said egress label switching node, by returning a label allocation request for allocating new label information for the partial section, which is between said ingress label switching node and said egress label switching node, of said new path from said egress label switching node to said ingress label switching node in response to reception of said path modifying request on said egress label switching node;
    allocating new label information (upstream side label information) for the partial section, which is between said ingress label switching node and said egress label switching node, of the upstream side in the detour path from said ingress node to said egress node forming the new path when receiving said path modifying request;
    associating each of said upstream side label information on said new path newly allocated and upstream side label information on said old path already allocated with downstream side label information already allocated with respect to said old path; and
    releasing only label information for the upstream side in said old path at the time of reception of a label release request on said old path for implementing partial path modification.

2. A path modifying method for use in a label transfer network according to claim 1, wherein said ingress node allocates new label information for a downstream side in said new path upon receipt of said label allocation request, and implements said partial path modification by associating said label information and upstream side label information already allocated with respect to said old path.

3. A path modifying method for use in a label transfer network according to claim 2, wherein said ingress node releases said label information on said old path after implementing said partial path modification, and transmits the label release request on said old path to said egress node.

4. A path modifying method for use in a label transfer network according to claim 3, wherein, upon receipt of said label release request, said egress node releases said label information on said old path and terminates further transfer of said label release request to a downstream side in said old path.

5. A path modifying method for use in a label transfer network according to claim 4, wherein said egress node recognizes that it is an egress node positioned at a downstream side end of said partial section, in a manner that the fact that it is a node which has initially transmitted said label allocation request is stored in a memory, and terminates the transfer of said label release request.

6. A path modifying method for use in a label transfer network including a plurality of label switching nodes for transferring received data in accordance with label information of said received data, said method comprising:
    transmitting a path modifying request from an ingress label switching node positioned at an upstream side end of a partial section of a work path to an egress label switching node positioned at a downstream end of the partial section via a detour path between said ingress label switching node and said egress label switching node; and
    executing a partial path modification from said work path (hereinafter referred as a "old path") of the partial section to said detour path so as to use said detour path as a new data transfer path (hereinafter referred as a "new path") between said ingress label switching node and said egress label switching node, by returning a label allocation request for allocating new label information for said new path from said egress label switching node to said ingress label switching node in response to reception of said path modify request on said egress label switching node,
    wherein said ingress node allocates new label information for a downstream side in said new path upon receipt of said label allocation request, and implements said partial path modification by associating said label information and upstream side label information already allocated with respect to said old path, and
    wherein said ingress node implements batch partial path modification from a plurality of old paths into said new path by transmitting a "more-than-one path modify request including information on said plurality of old paths, allocating a plurality of new label information for a downstream side in said new path when receiving a "more-than-one allocation request" including information on said plurality of old paths with respect to said more-than-one path modify request, and associating each of said plurality of label information with each of a plurality of upstream side label information already allocated to said plurality of old paths.

7. A path modifying method for use in a label transfer network according to claim 6, wherein, upon receipt of said more-than-one path modify request, said egress node allocates a plurality of new label information for an upstream side in said new path and associates each of said label information with each of a plurality of downstream side label information already allocated to said plurality of old paths for implementing said batch partial path modification from said plurality of old paths into said new path.

8. A path modifying method for use in a label transfer network according to claim 7, wherein said egress node transmits said more-than-one label allocation request, including said plurality of label information newly allocated to said new path, to said ingress node along said new path.

9. A path modifying method for use in a label transfer network according to claim 6, wherein, after implementing said path modification on said plurality of old paths, said ingress node releases said label information on said plurality of old paths, and transmits a label release request on said plurality of old paths toward said egress node.

10. A path modifying method for use in a label transfer network according to claim 1, wherein, upon receipt of said path modify request, said egress node allocates new label information for an upstream side in said new path and associates said label information with downstream side label information already allocated with respect to said old path for implementing said partial path modification.

11. A path modifying method for use in a label transfer network including a plurality of label switching nodes for transferring received data in accordance with label information of said received data, said method comprising:
  transmitting a path modifying request from an ingress label switching node positioned at an upstream side end of a partial section of a work path to an egress label switching node positioned at a downstream end of the partial section via a detour path between said ingress label switching node and said egress label switching node; and
  executing a partial path modification from said work path (hereinafter referred as a "old path") of the partial section to said detour path so as to use said detour path as a new data transfer path (hereinafter referred as a "new path") between said ingress label switching node and said egress label switching node, by returning a label allocation request for allocating new label information for said new path from said egress label switching node to said ingress label switching node in response to reception of said path modify request on said egress label switching node,
  wherein, in a case in which said received data is transferred in the form of an optical signal, information on a wavelength of said optical signal is used as said label information.

12. A path modifying method for use in a label transfer network including a plurality of label switching nodes for transferring received data in accordance with label information of said received data, said method comprising:
  transmitting a path modifying request from an ingress label switching node positioned at an upstream side end of a partial section of a work path to an egress label switching node positioned at a downstream end of the partial section via a detour path between said ingress label switching node and said egress label switching node; and
  executing a partial path modification from said work path (hereinafter referred as a "old path") of the partial section to said detour path so as to use said detour path as a new data transfer path (hereinafter referred as a "new path") between said ingress label switching node and said egress label switching node, by returning a label allocation request for allocating new label information for said new path from said egress label switching node to said ingress label switching node in response to reception of said path modify request on said egress label switching node,
  wherein, in a case in which said received data is transferred in a state put in a predetermined time slot, information on said time slot is used as said label information.

13. A path modifying method for use in a label transfer network including a plurality of label switching nodes for transferring received data in accordance with label information of said received data, when a path modifying request is transmitted from an ingress node positioned at an upstream side end of a partial section of a work path which is intended for path modification, to an egress node positioned at a downstream side end of said partial section implementing the steps of:
  when receiving said path modifying request, allocating new label information for the partial section, which is between said ingress label switching node and said egress label switching node, of an upstream side in a detour path from said ingress node to said egress node forming a new path;
  associating each of said upstream side label information on said new path newly allocated and upstream side label information on said work path (which will be referred to hereinafter as an "old path") already allocated with downstream side label information already allocated with respect to said old path; and
  releasing only label information for an upstream side in said old path at the time of reception of a label release request on said old path for implementing partial path modification.

14. A path modifying method for use in a label transfer network according to claim 13, wherein said egress node recognizes, on the basis of the presence of the association between said upstream side label information and said downstream side label information, that it is a node positioned at a downstream side end of said partial section, and terminates transfer of said label release request to a downstream side in said old path.

15. A path modifying method for use in a label transfer network including a plurality of label switching nodes for transferring received data in accordance with label information of said received data, when a path modify request is transmitted from an ingress node positioned at an upstream side end of a partial section of a work path an egress node positioned at a downstream side end of said partial section implementing the steps of:
  when receiving said path switching request, allocating new label information for an upstream side in a detour path from said ingress node to said egress node forming a new path;
  associating each of said upstream side label information on said new path newly allocated and upstream side label information on said work path (which will be referred to hereinafter as an "old path") already allocated with downstream side label information already allocated with respect to said old path and
  releasing only label information for an upstream side in said old path at the time of reception of a label release request on said old path for implementing partial path modification,
  wherein, in a case in which said received data is transferred in the form of an optical signal, information on a wavelength of said optical signal is used as said label information.

16. A path modifying method for use in a label transfer network including a plurality of label switching nodes for transferring received data in accordance with label information of said received data, when a path modify request is transmitted from an ingress node positioned at an upstream side end of a partial section of a work path an egress node positioned at a downstream side end of said partial section implementing the steps of:

when receiving said path switching request, allocating new label information for an upstream side in a detour path from said ingress node to said egress node forming a new path;

associating each of said upstream side label information on said new path newly allocated and upstream side label information on said work path (which will be referred to hereinafter as an "old path") already allocated with downstream side label information already allocated with respect to said old path and releasing only label information for an upstream side in said old path at the time of reception of a label release request on said old path for implementing partial path modification, wherein, in a case in which said received data is transferred in a state put in a predetermined time slot, information on said time slot is used as said label information.

17. A label switching node for use in a label transfer network which transfers received data on the basis of label information of said received data, comprising:

path modify request transmitting means for transmitting a path modifying request for a new data transfer path (which will be referred to hereinafter as a "new path") which is intended for path modification to a downstream side label switching node positioned on said new path;

label allocation request receiving means for receiving a label information allocation request (which will be referred to hereinafter as a "label allocation request") on said new path made with respect to said path modify request from said downstream side label switching node;

new downstream label allocating means for allocating new label information (new downstream side label) for the partial section, which is between said label switching node and said downstream side label switching node, of a downstream side in said new path when said label allocation request receiving means receives said label allocation request; and path modify control means for implementing path modification from said old path to said new path by associating said label information allocated by said new downstream label allocating means with upstream side label information (which will be referred to hereinafter as an "existing upstream side label") already allocated with respect to a data transfer path (which will be referred to hereinafter as an "old path") forming a modified object, wherein said downstream side label switching node comprises:

means for allocating new label information (new upstream side label) for the partial section, which is between said label switching node and said downstream side label switching node, of an upstream side in the new path when receiving said path modifying request;

means for associating each of said new upstream side label on said new path newly allocated and upstream side label information on said old path already allocated with downstream side label information already allocated with respect to said old path; and means for releasing only label information for the upstream side in said old path at the time of reception of a label release request on said old path for implementing partial path modification.

18. A label switching node for use in a label transfer network according to claim 17, wherein said path modify control means includes a label release request issuing section for, after the association between said existing upstream side label and said new downstream side label, releasing label information for a downstream side in said old path and further for issuing a label release request to a downstream side node positioned on said old path.

19. A label switching node for use in a label transfer network which transfers received data on the basis of label information of said received data, comprising:

path modify request transmitting means for transmitting a path modify request for a new data transfer path (which will be referred to hereinafter as a "new path") to a downstream side label switching node positioned on said new path;

label allocation request receiving means for receiving a label information allocation request (which will be referred to hereinafter as a "label allocation request") on said new path made with respect to said path modify request from said downstream side label switching node;

new downstream label allocating means for allocating new label information (new downstream side label) for a downstream side in said new path when said label allocation request receiving means receives said label allocation request; and path modify control means for implementing path modification from said old path to said new path by associating said label information allocated by said new downstream label allocating means with upstream side label information (which will be referred to hereinafter as an "existing upstream side label") already allocated with respect to a data transfer path (which will be referred to hereinafter as an "old path") forming a modified object, wherein said path modify control means includes a label release request issuing section for, after the association between said existing upstream side label and said new downstream side label, releasing label information for a downstream side in said old path and further for issuing a label release request to a downstream side node positioned on said old path, and wherein, in a case in which said received data is transferred in the form of an optical signal, said path modify control means is made to use information on a wavelength of said optical signal as said label information.

20. A label switching node for use in a label transfer network which transfers received data on the basis of label information of said received data, comprising:

path modify request transmitting means for transmitting a path modify request for a new data transfer path (which will be referred to hereinafter as a "new path") to a downstream side label switching node positioned on said new path;

label allocation request receiving means for receiving a label information allocation request (which will be referred to hereinafter as a "label allocation request") on said new path made with respect to said path modify request from said downstream side label switching node;

new downstream label allocating means for allocating new label information (new downstream side label) for a downstream side in said new path when said label allocation request receiving means receives said label allocation request; and path modify control means for implementing path modification from said old path to said new path by associating said label information allocated by said new downstream label allocating means with upstream side label information (which will be referred to hereinafter as an "existing upstream side label") already allocated with respect to a data transfer path (which will be referred to hereinafter as an "old path") forming a modified object, wherein said path modify control means includes a label release request issuing section for, after the association between said existing upstream side label and said new downstream side label, releasing label information for a downstream side in said old path and further for issuing a label release request to a downstream side node positioned on said old path, and wherein, in a case in which said received data is transferred in a state put in a predetermined time slot, said path modify control means is made to use information on said time slot as said label information.

21. A label switching node for use in a label transfer network which transfers received data on the basis of label information of said received data, comprising:

path modify request transmitting means for transmitting a path modify request for a new data transfer path (which will be referred to hereinafter as a "new path") to a downstream side label switching node positioned on said new path;

label allocation request receiving means for receiving a label information allocation request (which will be referred to hereinafter as a "label allocation request") on said new path made with respect to said path modify request from said downstream side label switching node;

new downstream label allocating means for allocating new label information (new downstream side label) for a downstream side in said new path when said label allocation request receiving means receives said label allocation request; and path modify control means for implementing path modification from said old path to said new path by associating said label information allocated by said new downstream label allocating means with upstream side label information (which will be referred to hereinafter as an "existing upstream side label") already allocated with respect to a data transfer path (which will be referred to hereinafter as an "old path") forming a modified object, wherein said path modify control means includes:

a more-than-one path modify request issuing section for issuing a more-than-one path modify request including information on a plurality of old paths;

a more-than-one label allocation request receiving section for receiving a more-than-one label allocation request including information on said plurality of old paths with respect to said more-than-one path modify request issued by said more-than-one path modify request issuing section;

a more-than-one new downstream label allocating section for allocating a plurality of new downstream side labels each corresponding to said new downstream side label when said more-than-one label allocation request receiving section receives said more-than-one label allocation request; and a batch path modifying section for implementing batch path modification from said plurality of old paths to said new path by associating each of said new downstream side labels allocated by said more-than-one new downstream label allocating section with each of a plurality of existing upstream side labels each corresponding to said existing upstream side label.

22. A label switching node for use in a label transfer network according to claim 21, wherein said path modify control means includes:

a more-than-one old path label information releasing section for releasing label information on said plurality of old paths after implementing said path modification on said plurality of old paths; and a more-than-one label release request issuing section for issuing a label release request on said plurality of old paths toward said egress node.

23. A label switching node for use in a label transfer network according to claim 21, wherein, in a case in which said received data is transferred in the form of an optical signal, said path modify control means is made to use information on a wavelength of said optical signal as said label information.

24. A label switching node for use in a label transfer network according to claim 21, wherein, in a case in which said received data is transferred in a state put in a predetermined time slot, said path modify control means is made to use information on said time slot as said label information.

25. A label switching node for use in a label transfer network according to claim 22, wherein, in a case in which said received data is transferred in the form of an optical signal, said path modify control means is made to use information on a wavelength of said optical signal as said label information.

26. A label switching node for use in a label transfer network according to claim 22, wherein, in a case in which said received data is transferred in a state put in a predetermined time slot, said path modify control means is made to use information on said time slot as said label information.

27. A label switching node for use in a label transfer network which transfers received data on the basis of label information of said received data, comprising:

path modify request transmitting means for transmitting a path modify request for a new data transfer path (which will be referred to hereinafter as a "new path") to a downstream side label switching node positioned on said new path;

label allocation request receiving means for receiving a label information allocation request (which will be referred to hereinafter as a "label allocation request") on said new path made with respect to said path modify request from said downstream side label switching node;

new downstream label allocating means for allocating new label information (new downstream side label) for a downstream side in said new path when said label allocation request receiving means receives said label allocation request; and path modify control means for implementing path modification from said old path to said new path by associating said label information allocated by said new downstream label allocating means with upstream side label information (which will be referred to hereinafter as an "existing upstream side label") already allocated with respect to a data transfer path (which will be referred to hereinafter as an "old path") forming a modified object, wherein, in a case in which said received data is transferred in the form of an optical signal, said path modify control means is made to use information on a wavelength of said optical signal as said label information.

28. A label switching node for use in a label transfer network which transfers received data on the basis of label information of said received data, comprising:

path modify request transmitting means for transmitting a path modify request for a new data transfer path (which will be referred to hereinafter as a "new path") to a downstream side label switching node positioned on said new path;

label allocation request receiving means for receiving a label information allocation request (which will be referred to hereinafter as a "label allocation request") on said new path made with respect to said path modify request from said downstream side label switching node;

new downstream label allocating means for allocating new label information (new downstream side label) for a downstream side in said new path when said label allocation request receiving means receives said label allocation request; and path modify control means for implementing path modification from said old path to said new path by associating said label information allocated by said new downstream label allocating means with upstream side label information (which will be referred to hereinafter as an "existing upstream side label") already allocated with respect to a data transfer path (which will be referred to hereinafter as an "old path") forming a modified object, wherein, in a case in which said received data is transferred in a state put in a predetermined time slot, said path modify control means is made to use information on said time slot as said label information.

29. A label switching node for use in a label transfer network which transfers received data on the basis of label information of said received data, comprising:

path modify request transmitting means for transmitting a path modify request for a new data transfer path (which will be referred to hereinafter as a "new path") to a downstream side label switching node positioned on said new path;

label allocation request receiving means for receiving a label information allocation request (which will be referred to hereinafter as a "label allocation request") on said new path made with respect to said path modify request from said downstream side label switching node;

new downstream label allocating means for allocating new label information (new downstream side label) for a downstream side in said new path when said label allocation request receiving means receives said label allocation request; and path modify control means for implementing path modification from said old path to said new path by associating said label information allocated by said new downstream label allocating means with upstream side label information (which will be referred to hereinafter as an "existing upstream side label") already allocated with respect to a data transfer path (which will be referred to hereinafter as an "old path") forming a modified object, wherein said label transfer network includes an administrative node for determining said old path and said new path on the basis of existing data transfer path information in said label transfer network and topology information on said label transfer network, and said path modify request transmitting means of said label switching node is made to transmit said path modify request when receiving information on at least said new path determined by said administrative node.

30. A label switching node for use in a label transfer network according to claim 29, wherein said path modify control means includes a path modify completion notifying means for notifying the completion of said partial path modification to said administrative node.

31. A label switching node for use in a label transfer network which transfers received data on the basis of label information of said received data, comprising:

path modify request receiving means for receiving a path modify request from an upstream side label switching node to itself for path modification into a new data transfer path (which will be referred to hereinafter as a "new path") which is intended for path modification;

new upstream side label allocating means for allocating new label information (which will be referred to hereinafter as a "new upstream side label") for a partial section, which is between said upstream side label switching node and said label switching node, of an upstream side in said new path when said path modify request is received by said path modify request receiving means;

label allocation request transmitting means for transmitting a label allocation request for allocation of new label information on said new path to said upstream side label switching node;

path modify control means for implementing path modification from a data transfer path (which will be referred to hereinafter as an "old path") forming a modified object to said new path by associating said new upstream side label allocated by said new upstream label allocating means with downstream side label information (which will be referred to hereinafter as an "existing downstream side label") already allocated with respect to said old path;

means for associating each of said new upstream side label on said new path newly allocated and upstream side label information on said old path already allocated with downstream side label information already allocated with respect to said old path; and means for releasing only label information for the upstream side in said old path at the time of reception of a label release request on said old path for implementing partial path modification.

32. A label switching node for use in a label transfer network according to claim 31, wherein said path modify control means includes label release request transfer judging means for, when receiving the label release request on said old path from an upstream side label switching node on said old path, making a decision as to whether or not to transfer said label release request to a downstream side in said old path.

33. A label switching node for use in a label transfer network according to claim 32, wherein said label release request transfer judging means includes:

a memory for storing transmission indicating information representative of the fact that said label allocation request transmitting section has initially transmitted said label allocation request; and a label release request terminating section for, when said transmission indicating information is stored in said memory at reception of said label release request, recognizing that it is a node positioned at a downstream side end of a partial section of said old path, to terminate said label release request without transferring it to a downstream side in said old path.

34. A label switching node for use in a label transfer network which transfers received data on the basis of label information of said received data, comprising:
    path modify request receiving means for receiving a path modify request from an upstream side label switching node to itself for path modification into a new data transfer path (which will be referred to hereinafter as a "new path");
    new upstream side label allocating means for allocating new label information (which will be referred to hereinafter as a "new upstream side label") for an upstream side in said new path when said path modify request is received by said path modify request receiving means;
    label allocation request transmitting means for transmitting a label allocation request for allocation of new label information on said new path to said upstream side label switching node; and
    path modify control means for implementing path modification from a data transfer path (which will be referred to hereinafter as an "old path") forming a modified object to said new path by associating said new upstream side label allocated by said new upstream label allocating means with downstream side label information (which will be referred to hereinafter as an "existing downstream side label") already allocated with respect to said old path,
    wherein said path modify control means includes label release request transfer judging means for, when receiving a label information release request (which will be referred to hereinafter as a "label release request") on said old path from an upstream side label switching node on said old path, making a decision as to whether or not to transfer said label release request to a downstream side in said old path, and
    wherein, in a case in which said received data is transferred in the form of an optical signal, said path modify control means is made to use information on a wavelength of said optical signal as said label information.

35. A label switching node for use in a label transfer network which transfers received data on the basis of label information of said received data, comprising:
    path modify request receiving means for receiving a path modify request from an upstream side label switching node to itself for path modification into a new data transfer path (which will be referred to hereinafter as a "new path");
    new upstream side label allocating means for allocating new label information (which will be referred to hereinafter as a "new upstream side label") for an upstream side in said new path when said path modify request is received by said path modify request receiving means;
    label allocation request transmitting means for transmitting a label allocation request for allocation of new label information on said new path to said upstream side label switching node; and
    path modify control means for implementing path modification from a data transfer path (which will be referred to hereinafter as an "old path") forming a modified object to said new path by associating said new upstream side label allocated by said new upstream label allocating means with downstream side label information (which will be referred to hereinafter as an "existing downstream side label") already allocated with respect to said old path,
    wherein said path modify control means includes label release request transfer judging means for, when receiving a label information release request (which will be referred to hereinafter as a "label release request") on said old path from an upstream side label switching node on said old path, making a decision as to whether or not to transfer said label release request to a downstream side in said old path, and
    wherein, in a case in which said received data is transferred in a state put in a predetermined time slot, said path modify control means is made to use information on said time slot as said label information.

36. A label switching node for use in a label transfer network which transfers received data on the basis of label information of said received data, comprising:
    path modify request receiving means for receiving a path modify request from an upstream side label switching node to itself for path modification into a new data transfer path (which will be referred to hereinafter as a "new path");
    new upstream side label allocating means for allocating new label information (which will be referred to hereinafter as a "new upstream side label") for an upstream side in said new path when said path modify request is received by said path modify request receiving means;
    label allocation request transmitting means for transmitting a label allocation request for allocation of new label information on said new path to said upstream side label switching node; and
    path modify control means for implementing path modification from a data transfer path (which will be referred to hereinafter as an "old path") forming a modified object to said new path by associating said new upstream side label allocated by said new upstream label allocating means with downstream side label information (which will be referred to hereinafter as an "existing downstream side label") already allocated with respect to said old path,
    wherein said path modify control means includes label release request transfer judging means for, when receiving a label information release request (which will be referred to hereinafter as a "label release request") on said old path from an upstream side label switching node on said old path, making a decision as to whether or not to transfer said label release request to a downstream side in said old path,
    wherein said label release request transfer judging means includes:
        a memory for storing transmission indicating information representative of the fact that said label allocation request transmitting section has initially transmitted said label allocation request; and
        a label release request terminating section for, when said transmission indicating information is stored in said memory at reception of said label release request, recognizing that it is a node positioned at a downstream side end of a partial section of said old path, to terminate said label release request without transferring it to a downstream side in said old path, and
    wherein, in a case in which said received data is transferred in the form of an optical signal, said path modify control means is made to use information on a wavelength of said optical signal as said label information.

37. A label switching node for use in a label transfer network which transfers received data on the basis of label information of said received data, comprising:
  path modify request receiving means for receiving a path modify request from an upstream side label switching node to itself for path modification into a new data transfer path (which will be referred to hereinafter as a "new path");
  new upstream side label allocating means for allocating new label information (which will be referred to hereinafter as a "new upstream side label") for an upstream side in said new path when said path modify request is received by said path modify request receiving means;
  label allocation request transmitting means for transmitting a label allocation request for allocation of new label information on said new path to said upstream side label switching node; and
  path modify control means for implementing path modification from a data transfer path (which will be referred to hereinafter as an "old path") forming a modified object to said new path by associating said new upstream side label allocated by said new upstream label allocating means with downstream side label information (which will be referred to hereinafter as an "existing downstream side label") already allocated with respect to said old path,
  wherein said path modify control means includes label release request transfer judging means for, when receiving a label information release request (which will be referred to hereinafter as a "label release request") on said old path from an upstream side label switching node on said old path, making a decision as to whether or not to transfer said label release request to a downstream side in said old path,
  wherein said label release request transfer judging means includes:
    a memory for storing transmission indicating information representative of the fact that said label allocation request transmitting section has initially transmitted said label allocation request; and
    a label release request terminating section for, when said transmission indicating information is stored in said memory at reception of said label release request, recognizing that it is a node positioned at a downstream side end of a partial section of said old path, to terminate said label release request without transferring it to a downstream side in said old path, and
  wherein, in a case in which said received data is transferred in a state put in a predetermined time slot, said path modify control means is made to use information on said time slot as said label information.

38. A label switching node for use in a label transfer network which transfers received data on the basis of label information of said received data, comprising:
  path modify request receiving means for receiving a path modify request from an upstream side label switching node to itself for path modification into a new data transfer path (which will be referred to hereinafter as a "new path");
  new upstream side label allocating means for allocating new label information (which will be referred to hereinafter as a "new upstream side label") for an upstream side in said new path when said path modify request is received by said path modify request receiving means;
  label allocation request transmitting means for transmitting a label allocation request for allocation of new label information on said new path to said upstream side label switching node; and
  path modify control means for implementing path modification from a data transfer path (which will be referred to hereinafter as an "old path") forming a modified object to said new path by associating said new upstream side label allocated by said new upstream label allocating means with downstream side label information (which will be referred to hereinafter as an "existing downstream side label") already allocated with respect to said old path,
  wherein said path modify control means includes:
    a more-than-one path modify request receiving section for receiving a more-than-one path modify request including information on a plurality of old paths from an upstream side label switching node on said new path;
    a more-than-one new upstream label allocating section for allocating a plurality of new upstream side labels each corresponding to said new upstream side label when said more-than-one path modify request is received by said more-than-one path modify request receiving section;
    a more-than-one label allocation request issuing section for, when said more-than-one path modify request is received by said more-than-one path modify request receiving section, issuing a more-than-one label allocation request including information on said plurality of old paths to an upstream side label switching node on said new path; and
    a batch path modifying section for implementing batch path modification from said plurality of old paths to said new path by associating each of said new upstream side labels allocated by said more-than-one new upstream label allocating section with each of a plurality of existing downstream side labels each corresponding to said existing downstream side label.

39. A label switching node for use in a label transfer network according to claim 38, wherein, in a case in which said received data is transferred in the form of an optical signal, said path modify control means is made to use information on a wavelength of said optical signal as said label information.

40. A label switching node for use in a label transfer network according to claim 38, wherein, in a case in which said received data is transferred in a state put in a predetermined time slot, said path modify control means is made to use information on said time slot as said label information.

41. A label switching node for use in a label transfer network according to claim 31, wherein said path modify control means includes:
  a label merging section for making label mergence by associating each of label information for an upstream side in said new path newly allocated upon receipt of said path modify request and label information for an upstream side in said old path already allocated with downstream side label information already allocated with respect to said old path; and
  a label merge releasing section for releasing only said label information for said upstream side in said old path at the time of reception of a label release request on said old path to cancel said label mergence for implementing said partial path modification.

42. A label switching node for use in a label transfer network according to claim 41, wherein said path modify control means includes a label release request transfer judging section for, when receiving a label information release request (which will be referred to hereinafter as a "label release request") on said old path from an upstream side label switching node on said old path, making a decision as to whether or not to transfer said label release request to a downstream side in said old path, and
    said label release request transfer judging section includes:
    a label merge judging section for making a decision on whether said label mergence is made or not; and
    a label release request terminating section for, when a decision that said label mergence is already made is made by said label merge judging section at reception of said label release request, recognizing that a node, it pertains to, is a node positioned at a downstream side end of a partial section of said old path and for terminating said label release request without transferring it to a downstream side in said old path.

43. A label switching node for use in a label transfer network which transfers received data on the basis of label information of said received data, comprising:
    path modify request receiving means for receiving a path modify request from an upstream side label switching node to itself for path modification into a new data transfer path (which will be referred to hereinafter as a "new path");
    new upstream side label allocating means for allocating new label information (which will be referred to hereinafter as a "new upstream side label") for an upstream side in said new path when said path modify request is received by said path modify request receiving means;
    label allocation request transmitting means for transmitting a label allocation request for allocation of new label information on said new path to said upstream side label switching node; and
    path modify control means for implementing path modification from a data transfer path (which will be referred to hereinafter as an "old path") forming a modified object to said new path by associating said new upstream side label allocated by said new upstream label allocating means with downstream side label information (which will be referred to hereinafter as an "existing downstream side label") already allocated with respect to said old path,
    wherein said path modify control means includes:
    a label merging section for making label mergence by associating each of label information for an upstream side in said new path newly allocated upon receipt of said path modify request and label information for an upstream side in said old path already allocated with downstream side label information already allocated with respect to said old path; and
    a label merge releasing section for releasing only said label information for said upstream side in said old path at the time of reception of a label release request on said old path to cancel said label mergence for implementing said partial path modification,
    wherein, in a case in which said received data is transferred in the form of an optical signal, said path modify control means is made to use information on a wavelength of said optical signal as said label information.

44. A label switching node for use in a label transfer network which transfers received data on the basis of label information of said received data, comprising:
    path modify request receiving means for receiving a path modify request from an upstream side label switching node to itself for path modification into a new data transfer path (which will be referred to hereinafter as a "new path");
    new upstream side label allocating means for allocating new label information (which will be referred to hereinafter as a "new upstream side label") for an upstream side in said new path when said path modify request is received by said path modify request receiving means;
    label allocation request transmitting means for transmitting a label allocation request for allocation of new label information on said new path to said upstream side label switching node; and
    path modify control means for implementing path modification from a data transfer path (which will be referred to hereinafter as an "old path") forming a modified object to said new path by associating said new upstream side label allocated by said new upstream label allocating means with downstream side label information (which will be referred to hereinafter as an "existing downstream side label") already allocated with respect to said old path,
    wherein said path modify control means includes:
    a label merging section for making label mergence by associating each of label information for an upstream side in said new path newly allocated upon receipt of said path modify request and label information for an upstream side in said old path already allocated with downstream side label information already allocated with respect to said old path; and
    a label merge releasing section for releasing only said label information for said upstream side in said old path at the time of reception of a label release request on said old path to cancel said label mergence for implementing said partial path modification,
    wherein, in a case in which said received data is transferred in a state put in a predetermined time slot, said path modify control means is made to use information on said time slot as said label information.

45. A label switching node for use in a label transfer network which transfers received data on the basis of label information of said received data, comprising:
    path modify request receiving means for receiving a path modify request from an upstream side label switching node to itself for path modification into a new data transfer path (which will be referred to hereinafter as a "new path");
    new upstream side label allocating means for allocating new label information (which will be referred to hereinafter as a "new upstream side label") for an upstream side in said new path when said path modify request is received by said path modify request receiving means;
    label allocation request transmitting means for transmitting a label allocation request for allocation of new label information on said new path to said upstream side label switching node; and
    path modify control means for implementing path modification from a data transfer path (which will be referred to hereinafter as an "old path") forming a modified object to said new path by associating said new upstream side label allocated by said new upstream label allocating means with downstream side label information (which will be referred to hereinafter as an "existing downstream side label") already allocated with respect to said old path,
    wherein said path modify control means includes:
    a label merging section for making label mergence by associating each of label information for an upstream side in said new path newly allocated upon receipt of said path modify request and label information for an upstream side in said old path already allocated with downstream side label information already allocated with respect to said old path; and a label merge releasing section for releasing only said label information for said upstream side in said old path at the time of reception of a label release request on said old path to cancel said label mergence for implementing said partial path modification, wherein said path modify control means includes a label release request transfer judging section for, when receiving a label information release request (which will be referred to hereinafter as a "label release request") on said old path from an upstream side label switching node on said old path, making a decision as to whether or not to transfer said label release request to a downstream side in said old path, wherein said label release request transfer judging section includes:

a label merge judging section for making a decision on whether said label mergence is made or not; and a label release request terminating section for, when a decision that said label mergence is already made is made by said label merge judging section at reception of said label release request, recognizing that a node, it pertains to, is a node positioned at a downstream side end of a partial section of said old path and for terminating said label release request without transferring it to a downstream side in said old path, and wherein, in a case in which said received data is transferred in the form of an optical signal, said path modify control means is made to use information on a wavelength of said optical signal as said label information.

46. A label switching node for use in a label transfer network which transfers received data on the basis of label information of said received data, comprising:

path modify request receiving means for receiving a path modify request from an upstream side label switching node to itself for path modification into a new data transfer path (which will be referred to hereinafter as a "new path");

new upstream side label allocating means for allocating new label information (which will be referred to hereinafter as a "new upstream side label") for an upstream side in said new path when said path modify request is received by said path modify request receiving means;

label allocation request transmitting means for transmitting a label allocation request for allocation of new label information on said new path to said upstream side label switching node; and path modify control means for implementing path modification from a data transfer path (which will be referred to hereinafter as an "old path") forming a modified object to said new path by associating said new upstream side label allocated by said new upstream label allocating means with downstream side label information (which will be referred to hereinafter as an "existing downstream side label") already allocated with respect to said old path, wherein said path modify control means includes:

a label merging section for making label mergence by associating each of label information for an upstream side in said new path newly allocated upon receipt of said path modify request and label information for an upstream side in said old path already allocated with downstream side label information already allocated with respect to said old path; and a label merge releasing section for releasing only said label information for said upstream side in said old path at the time of reception of a label release request on said old path to cancel said label mergence for implementing said partial path modification, wherein said path modify control means includes a label release request transfer judging section for, when receiving a label information release request (which will be referred to hereinafter as a "label release request") on said old path from an upstream side label switching node on said old path, making a decision as to whether or not to transfer said label release request to a downstream side in said old path, wherein said label release request transfer judging section includes:

a label merge judging section for making a decision on whether said label mergence is made or not; and a label release request terminating section for, when a decision that said label mergence is already made is made by said label merge judging section at reception of said label release request, recognizing that a node, it pertains to, is a node positioned at a downstream side end of a partial section of said old path and for terminating said label release request without transferring it to a downstream side in said old path, and wherein, in a case in which said received data is transferred in a state put in a predetermined time slot, said path modify control means is made to use information on said time slot as said label information.

47. A label switching node for use in a label transfer network which transfers received data on the basis of label information of said received data, comprising:

path modify request receiving means for receiving a path modify request from an upstream side label switching node to itself for path modification into a new data transfer path (which will be referred to hereinafter as a "new path");

new upstream side label allocating means for allocating new label information (which will be referred to hereinafter as a "new upstream side label") for an upstream side in said new path when said path modify request is received by said path modify request receiving means;

label allocation request transmitting means for transmitting a label allocation request for allocation of new label information on said new path to said upstream side label switching node; and path modify control means for implementing path modification from a data transfer path (which will be referred to hereinafter as an "old path") forming a modified object to said new path by associating said new upstream side label allocated by said new upstream label allocating means with downstream side label information (which will be referred to hereinafter as an "existing downstream side label") already allocated with respect to said old path, wherein, in a case in which said received data is transferred in the form of an optical signal, said path modify control means is made to use information on a wavelength of said optical signal as said label information.

48. A label switching node for use in a label transfer network which transfers received data on the basis of label information of said received data, comprising:

path modify request receiving means for receiving a path modify request from an upstream side label switching node to itself for path modification into a new data transfer path (which will be referred to hereinafter as a "new path");

new upstream side label allocating means for allocating new label information (which will be referred to hereinafter as a "new upstream side label") for an upstream side in said new path when said path modify request is received by said path modify request receiving means;

label allocation request transmitting means for transmitting a label allocation request for allocation of new label information on said new path to said upstream side label switching node; and path modify control means for implementing path modification from a data transfer path (which will be referred to hereinafter as an "old path") forming a modified object to said new path by associating said new upstream side label allocated by said new upstream label allocating means with downstream side label information (which will be referred to hereinafter as an "existing downstream side label") already allocated with respect to said old path, wherein, in a case in which said received data is transferred in a state put in a predetermined time slot, said path modify control means is made to use information on said time slot as said label information.

49. A label switching node for use in a label transfer network which transfers received data on the basis of label information of said received data, comprising:

more-than-one label allocation request receiving means for receiving a more-than-one label allocation request including information on a plurality of data transfer paths (which will be referred to hereinafter as "new paths") forming modified-into paths;

more-than-one new label allocating means for, when said more-than-one label allocation request is received by said more-than-one label allocation request receiving means, allocating new label information (which will be referred to hereinafter as a "new upstream side label" and a "new downstream side label", respectively) with respect to an upstream side and downstream side of each of said plurality of new paths; and batch path establishing means for establishing said plurality of new paths in a batch manner by associating said new upstream side label with said new downstream side label on each of said plurality of new paths.

50. A path modifying method for use in a label transfer network which includes a plurality of label switching nodes each for transferring received data on the basis of label information of said received data and an administrative node for managing at least topology information on said label transfer network including said plurality of label switching nodes, said method comprising:

a request transferring step in which a label switching node, when receiving one of a new path adding request or a bandwidth increasing request on an existing path, transfers said request to said administrative node;

a new path confirming step in which, upon receipt of said request, said administrative node obtains a path (which will be referred to hereinafter as a "new path") to be established on the basis of said topology information and confirms whether or not a resource of a link on said new path is in an insufficient condition;

a shifted-to path specifying step in which, when said resource is in the insufficient condition, said administrative node obtains one of new and existing optical paths as a shifted-to path from an existing path passing through said link;

a path modify signaling step in which, for path modification into said optical path forming said shifted-to path, said administrative node gives an instruction to an ingress node on said optical path for activating path modify signaling;

a path modifying step in which a node on said new path of said existing path handles said path modify signaling to implement the path modification and a node on said old path of said existing path handles said path modify signaling to cut off said existing path;

a new path establishment signaling step in which said administrative node gives an instruction to an ingress node on said new path for activating new path establishment signaling; and a new path establishing step in which each of said ingress node, a transit node and an egress node on said new path handles said new path establishment signaling to establish said new path on said link released due to said path modification.

51. A path modifying method for use in a label transfer network according to claim 50, wherein, after said shifted-to path specifying step and before said path modify signaling step, said administrative node implements a new optical path establishment signaling step of giving an instruction to an ingress node on said new optical path for activating new optical path establishment signaling for establishment of said new optical path and a new optical path establishing step of establishing said new optical path by means of said new optical path establishment signaling being handled by each of said ingress node, said transit node and said egress node on said new optical path.

52. A path modifying method for use in a label transfer network including a plurality of label switching nodes each for transferring received data on the basis of label information of said received data, said method comprising:

a new path confirming step in which a label switching node, when receiving one of a new path adding request or a bandwidth increasing request on an existing path, obtains a path (which will be referred to hereinafter as a "new path") to be established on the basis of topology information on said label transfer network and confirms whether or not a resource of a link on said new path is in an insufficient condition;

a shifted-to path specifying step in which, when said resource is in the insufficient condition, said administrative node obtains one of new and existing optical paths as a shifted-to path from an existing path passing through said link;

a path modify signaling step in which, for path modification into said optical path forming the shifted-to path, said administrative node gives an instruction to a ingress node on said optical path for activating a path modify signaling;

a path modifying step in which a node on said new path of said existing path handles said path modify signaling to implement said path modification and a node on an old path of said existing path handles said path modify signaling to cut off said existing path;

a new path establishment signaling step in which said administrative node gives an instruction to an ingress node on said new path for activating a new path establishment signaling; and a new path establishing step in which each of said ingress node, a transit node and an egress node on said new path handles said new path establishment signaling to establish said new path on said link in which said resource is released due to said path modification.

53. A path modifying method for use in a label transfer network according to claim 52, wherein, after said shifted-to path specifying step and before said path modify signaling step, said administrative node implements a new optical path establishment signaling step of giving an instruction to an ingress node on said new optical path for activating new optical path establishment signaling for establishment of said new optical path and a new optical path establishing step of establishing said new optical path by means of said new optical path establishment signaling being handled by each of said ingress node, said transit node and said egress node on said new optical path.

* * * * *